United States Patent
Kobayashi et al.

(10) Patent No.: US 7,027,913 B2
(45) Date of Patent: Apr. 11, 2006

(54) VEHICLE CONTROL SYSTEM

(75) Inventors: Masayuki Kobayashi, Anjo (JP); Takeshi Suganuma, Kariya (JP)

(73) Assignee: Denso Corporation, Kariya (JP)

( * ) Notice: Subject to any disclaimer, the term of this patent is extended or adjusted under 35 U.S.C. 154(b) by 153 days.

(21) Appl. No.: 10/721,334

(22) Filed: Nov. 26, 2003

(65) Prior Publication Data
US 2004/0107041 A1    Jun. 3, 2004

(30) Foreign Application Priority Data
Nov. 29, 2002   (JP)   ............... 2002-348016
Oct. 10, 2003   (JP)   ............... 2003-352484

(51) Int. Cl.
*G06F 19/00*   (2006.01)
*B60R 16/02*   (2006.01)

(52) U.S. Cl. .................. 701/114; 701/115; 73/117.3

(58) Field of Classification Search ............... 701/114, 701/115, 101, 102, 29, 35; 73/116, 117.3
See application file for complete search history.

(56) References Cited

U.S. PATENT DOCUMENTS

| | | | |
|---|---|---|---|
| 5,604,304 A * | 2/1997 | Kokubo et al. | ............ 701/101 |
| 5,748,923 A | 5/1998 | Eitrich | ............ 710/305 |
| 6,292,741 B1 | 9/2001 | Bitzer et al. | ............ 701/115 |
| 2001/0018720 A1 | 8/2001 | Weigl et al. | |

FOREIGN PATENT DOCUMENTS

| | | | |
|---|---|---|---|
| JP | 6-146985 A | * | 5/1994 |
| JP | 07-089398 | | 4/1995 |
| JP | 07-279745 | | 10/1995 |
| JP | 2000-268288 | | 9/2000 |
| JP | 2003-007532 | | 1/2003 |

* cited by examiner

*Primary Examiner*—Hieu T. Vo
(74) *Attorney, Agent, or Firm*—Nixon & Vanderhye P.C.

(57) ABSTRACT

A vehicle control system has an ECU for controlling an actuator and a sensor ECU that receives a crankshaft signal of a vehicle engine. These ECUs exchange information via an intra-vehicle communication network for attaining distributed functions. The sensor ECU calculates a crankshaft angle on the basis of a received camshaft signal and crankshaft signal and outputs the calculated crankshaft angle to a TCM ECU. The TCM ECU determines operation timing of an igniter on the basis of the received crankshaft angle and outputs the operation timing of the igniter to an ignition ECU. The ignition ECU controls the igniter on the basis of the received timing. As a result, temporal deviation between the crankshaft angle and the control timing of the actuator is suppressed.

20 Claims, 13 Drawing Sheets

| CYLINDER | 0°CA~180°CA | 180°CA~360°CA | 360°CA~540°CA | 540°CA~720°CA |
|---|---|---|---|---|
| #1 | SUCTION | COMPRESSION | EXPLOSION | EXHAUST |
| #2 | COMPRESSION | EXPLOSION | EXHAUST | SUCTION |
| #3 | EXHAUST | SUCTION | COMPRESSION | EXPLOSION |
| #4 | EXPLOSION | EXHAUST | SUCTION | COMPRESSION |

←—————— 720°CA ——————→

VEHICLE CONTROL SYSTEM

CROSS REFERENCE TO RELATED APPLICATION

This application is based on and incorporates herein by reference Japanese Patent Applications No. 2002-348016 filed on Nov. 29, 2002 and No. 2003-352484 filed on Oct. 10, 2003.

FIELD OF THE INVENTION

The present invention relates to a vehicle control system for controlling an actuator that operates in synchronism with the crankshaft angle of a vehicle engine.

BACKGROUND OF THE INVENTION

In vehicle control systems, control functions of an entire vehicle are distributed. Control devices are provided for the respective distributed control functions, and adjustments between the distributed control functions are made in such a manner that they communicate with each other via an intra-vehicle communication network (for example, tta Group, "TTA-Group Forum," [online], Internet URL: http://www.ttpforum.org/, search date: Nov. 19, 2002).

Exemplary communication protocols that are used in vehicle control systems that perform distributed processing of the above kind are TTP/C of the TTP consortium in Europe (JP-A-2000-268288) and FlexRay of the FlexRay consortium (Flex-Ray-Consortium, FlexRay, [online], Internet URL: http://www.flexray-group.org/, search date: Nov. 19, 2002). These are communication protocols based on TDMA (time division multiple access). TDMA realizes multiple access in such a manner that time slots that are separated from each other by a constant time interval are occupied by data of different communications.

In vehicle control systems using TDMA, time slots are assigned in advance to respective ECUs as control devices and each ECU can send data to an intra-vehicle communication network using only the time slot assigned thereto. The assigned time slots have a periodic structure and hence it is not the case that each ECU can send data at any time.

If a vehicle control system that performs distributed processing of the above kind is configured in such a manner that an ECU for controlling an engine ignition device, a fuel injection device, and electromagnetic valves and an ECU for detecting the rotation of a crankshaft are distributed and signal exchange between those ECUs is performed via an intra-vehicle communication network, various advantages are obtained. For example, the configuration is made simpler than in conventional engine control systems.

However, in such a vehicle control system, if, for example, TDMA is employed in the above manner, problems occur in the controls on the fuel injection device, the ignition device, the electromagnetic valves, etc. that are performed in synchronism with the crankshaft rotation of an engine. In general, the crankshaft rotation is detected by using a crankshaft signal that is output from a crankshaft sensor. The crankshaft signal is such that the signal level is alternately switched between a high level and a low level every time the crankshaft rotates an interval of a prescribed value (e.g., 2.5°). Consideration will be given below to a sensor ECU that sends information indicating the switching between the high level and the low level to the intra-vehicle communication network on the basis of the crankshaft signal is supplied from the crankshaft sensor.

FIG. 12 shows a time relationship between the crankshaft signal and information that relates to the crankshaft signal and is sent to the intra-vehicle communication network. In FIG. 12, the solid line in the top part and the rectangles in the bottom part represent the level of the crankshaft signal and an arrangement of transmission time slots that are assigned to the ECUs, respectively. Time slots 101, 102, and 103 that are represented by hatched rectangles in the bottom part are assigned to transmission from the sensor ECU.

Information indicating switching to the high level of the crankshaft signal and corresponding to 0° CA (crankshaft angle) that corresponds to a TDC (top dead center point) of the crankshaft is sent from the sensor ECU by using the time slot 101 that occurs immediately after the switching. Information indicating switching to the low level of the crankshaft signal and corresponding to 2.5° CA (crankshaft angle) is sent by using the time slot 102. Then, information indicating switching to the high level and corresponding to 5° CA (crankshaft angle) is sent by using the time slot 103. Other ECUs that receive the crankshaft signal switching information that is sent in the above manner can recognize the crankshaft angle by counting the number of received pieces of information.

However, as shown in FIG. 12, where the time slots are not synchronized with the crankshaft rotation, temporal deviations occur between the crankshaft rotation and the pieces of information relating to the crankshaft rotation that are actually sent to the intra-vehicle communication network.

Further, the crankshaft rotation speed varies depending on engine rotation speed, which means that the period of the crankshaft signal varies depending on engine rotation speed. FIG. 13 shows a relationship between the crankshaft signal and the time slots in a case that the engine rotation speed is higher than in the case of FIG. 12.

In this cases the level of the crankshaft signal varies three times (i.e., to low, high, and low) from an instant when information indicating switching to the high level is sent by using a time slot 104 to an instant when the next assigned time slot 105 arrives. However, the sensor ECU merely sends, to the network, by using the time slot 105, information indicating switching to the low level that occurs immediately before, reception-side ECUs cannot receive two pieces of information indicating switching of the crankshaft signal. As a result, the reception-side ECUs recognize that a value that is deviated from the true crankshaft angle by 5° is a current crankshaft angle. If this situation continues, the deviation increases and the deviation between the control timing and the crankshaft angle also increases. This results in a problem that in terms of the relationship between the engine ignition and the fuel injection processing neither a high engine power nor a low degree of emission can be obtained.

Similar problems may occur even in the case that TDMA is not employed as a communication method of the intra-vehicle communication network. That is, problems occur when because of a low network communication rate the next and even the second next crankshaft signal switching timing arrives before the sensor ECU completes outputting information indicating switching of the crankshaft signal to the network.

SUMMARY OF THE INVENTION

The present invention has an object of the invention to suppress a temporal deviation between the crankshaft angle of a vehicle engine and the control timing of an actuator that operates in synchronism with the crankshaft angle in a vehicle control system in which an ECU for controlling the actuator and a sensor ECU that receives a crankshaft signal of the vehicle are distributed and these ECUs exchange information via an intra-vehicle communication network.

According to the invention, a sensor ECU sends a calculated crankshaft angle to an intra-vehicle communication network and the crankshaft angle information passes through the network. Therefore, even if crankshaft angle information that has been sent is lost because of problems relating to communication rates etc., the control can be performed properly by using a crankshaft angle that is sent next time, and hence the temporal deviation between the control on the actuator and the crankshaft angle can be suppressed.

The crankshaft angle as mentioned above is a value of the crankshaft rotation angle itself rather than a relative value indicating a crankshaft angle variation such as a crankshaft signal. The term "crankshaft angle" is not limited to the crankshaft angle itself and encompasses a value such as a crankshaft counter value that is defined uniquely from the crankshaft angle. A timing determining section may be provided either in an actuator ECU or in another ECU of the vehicle control system.

Further, according to the invention, in a vehicle control system in which ECUs exchange information via an intra-vehicle communication network, the intra-vehicle communication network allows a crankshaft ECU to send information based on a crankshaft signal without losing it. The temporal deviation between the actuator control timing and the crankshaft angle can thus be suppressed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
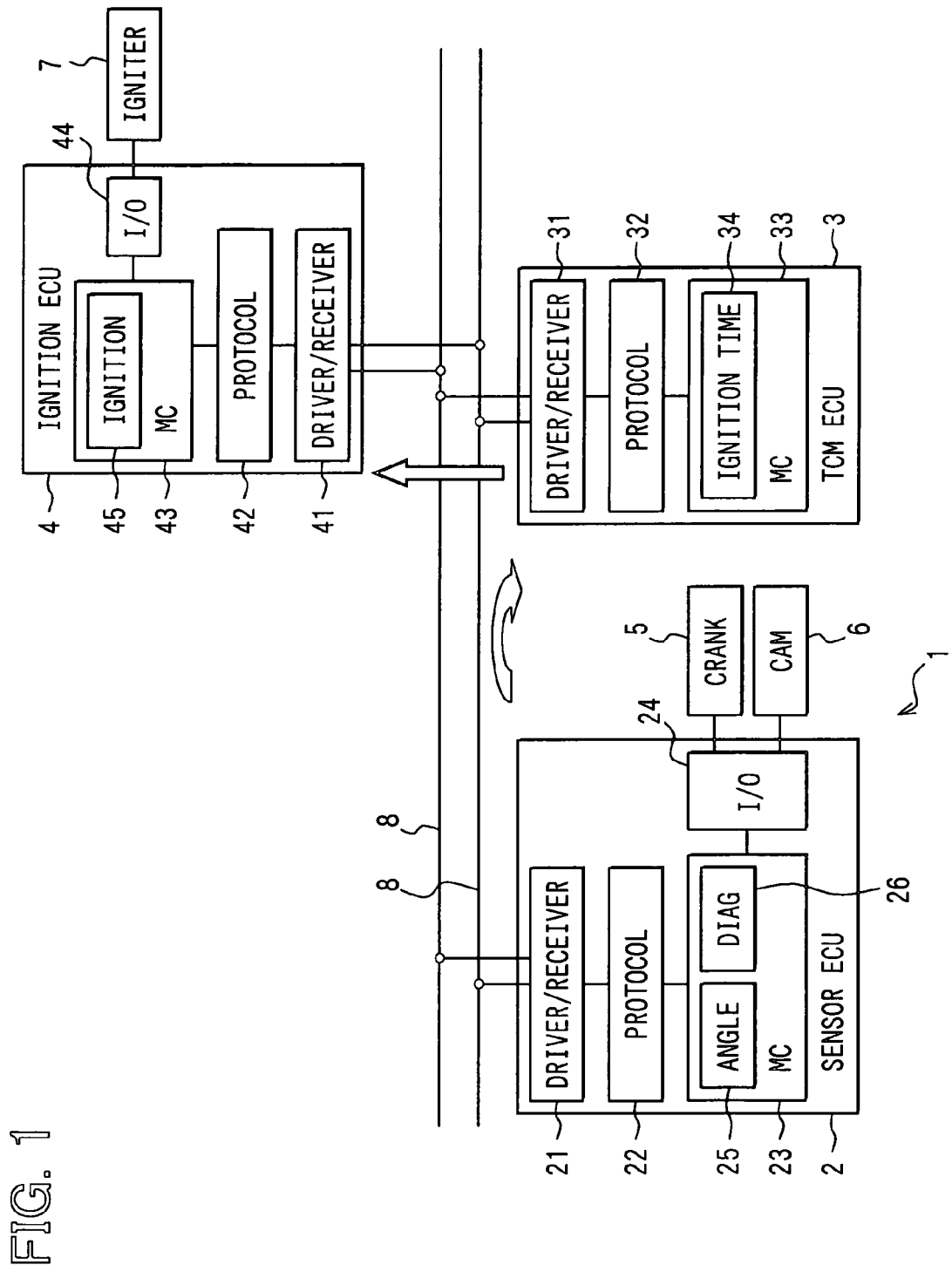
FIG. 1 shows a vehicle control system according to a first embodiment of the present invention.

FIG. 1 shows a vehicle control system 1 according to a first embodiment of the present invention. The vehicle control system 1 is composed of a sensor ECU 2, a TCM (transmission control module) ECU 3, an ignition ECU 4, a crankshaft sensor 5, a camshaft sensor 6, an igniter 7, intra-vehicle communication networks 8, and ECUs (not shown) for controlling other vehicle functions that are connected to the intra-vehicle communication networks 8.

The intra-vehicle communication networks 8 serve for communication between the ECUs for controlling the distributed vehicle functions and other components. In this embodiment, the intra-vehicle communication networks 8 employ TDMA and are doubled to increase the communication robustness.

The crankshaft sensor 5 detects the crankshaft rotation of the vehicle and switches its output signal between a high level and a low level in synchronism with the engine crankshaft rotation. More specifically, the crankshaft sensor 5 switches its output signal from high to low or low to high every time the crankshaft rotates by 2.5°. This is done by forming 72 teeth each having a length of 2.5° in terms of angle at regular intervals along the circumference of a rotor that is driven by the crankshaft and causing the crankshaft sensor 5 to output a signal that varies in synchronism with the teeth of the rotor. The value of the crankshaft angle ranges from 0° CA to 720° CA; that is, two rotations of the crankshaft correspond to one cycle of the crankshaft angle (one rotation of the rotor).

However, one of the teeth on the rotor is not formed actually; that is, the rotor lacks one tooth. Therefore, the signal that is output from the crankshaft sensor 5 is such that the low level continues for a time corresponding to 7.5° in each rotation of the crankshaft. The lack of one tooth makes it possible to recognize a particular portion of the rotor and hence particular crankshaft rotation angles, which are 0° CA (=720° CA) and 360° CA in this first embodiment.

The camshaft sensor 6 detects the rotation of a camshaft of the vehicle and switches its output signal between a high level and a low level in synchronism with the camshaft rotation. More specifically, the camshaft sensor 6 switches its output signal from low to high every time the camshaft makes one rotation (360°) and switches it from high to low when the camshaft has rotated by 2.5° after the preceding switching from low to high. This is done by forming only one tooth having a length of 2.5° in terms of angle at regular intervals on the circumference of a rotor that is driven by the camshaft and causing the camshaft sensor 6 to output a signal that varies in synchronism with the tooth of the rotor.

The camshaft makes one rotation per two rotations of the crankshaft. The rotation of the crankshaft and the rotation of the camshaft are synchronized with each other so that a long low level corresponding to the toothless portion appears in a crankshaft signal (Scrank) within a short time from a high level that corresponds to the tooth of the rotor that is attached to the camshaft. Therefore, when a low level corresponding to the toothless portion has appeared in the crankshaft signal, whether the toothless portion is of 0° CA or 360° CA can be determined on the basis of whether a high level appearing in a camshaft signal (Scam) immediately before. In this embodiment, a rise that occurs immediately after a low level corresponding to the toothless portion that occurs within a short time from a high level in the camshaft signal corresponds to 0° CA and a rise of the other timing that occurs immediately after a low level corresponding to the toothless portion corresponds to 360° CA.

The sensor ECU 2 has a driver/receiver IC 21, a protocol IC 22, a microcomputer (MC) 23, and an I/O 24.

The driver/receiver IC 21 converts an electrical signal received from the intra-vehicle communication networks 8 into digital data that can be handled in the protocol IC 22 and outputs the digital data to the protocol IC 22. Further, the driver/receiver IC 21 converts digital data received from the protocol IC 22 into an electrical signal and outputs it to the intra-vehicle communication networks 8.

The protocol IC 22 processes data received from the driver/receiver IC 21 according to a frame format of a communication protocol used and thereby converts the received data into data that is in such a form as to be independent of the communication protocol, and outputs the latter data to the microcomputer 23. Further, the protocol IC 22 changes the frame format of data received from the microcomputer 23, for example, adds an ID or a CRC code, so that the data comes to comply with the communication protocol used, and outputs resulting data to the driver/receiver IC 21.

The I/O 24 converts a signal received from the crankshaft sensor 5 or the camshaft sensor 6 into digital data and outputs the digital data to the microcomputer 23.

The microcomputer 23 has a CPU, a RAM, and a flash memory (not shown). The CPU performs various kinds of processing by reading programs stored in the flash memory and executing those. If necessary for the processing of the CPU, the microcomputer 23 writes or reads data to or from the RAM. If it is necessary to communicate with another ECU, the microcomputer 23 receives data from the protocol IC 22 or outputs, to the protocol IC 22, data to be transmitted. Examples of processes to be executed by the microcomputer 23 are a crankshaft angle process 25 (described later) and a diagnostic process 26 for making a failure diagnosis on the crankshaft sensor 5 and the camshaft sensor 6.

The ignition ECU 4 has a driver/receiver IC 41, a protocol IC 42, a microcomputer 43, and an I/O 44.

The driver/receiver IC 41, the protocol IC 42, and the microcomputer 43 are equivalent in function to the driver/receiver IC 21, the protocol IC 22, and the microcomputer 23, respectively. However, a program of an ignition process 45 is stored in the flash memory of the microcomputer 43. According to that program, the microcomputer 43 outputs ignition instruction data to the I/O 44 on the basis of an ignition timing notice that is received via the intra-vehicle communication networks 8, the driver/receiver IC 41, and the protocol IC 42.

When receiving ignition instruction data from the microcomputer 43, the I/O 44 outputs an ignition signal to the igniter 7 for igniting the engine.

Figure 2:
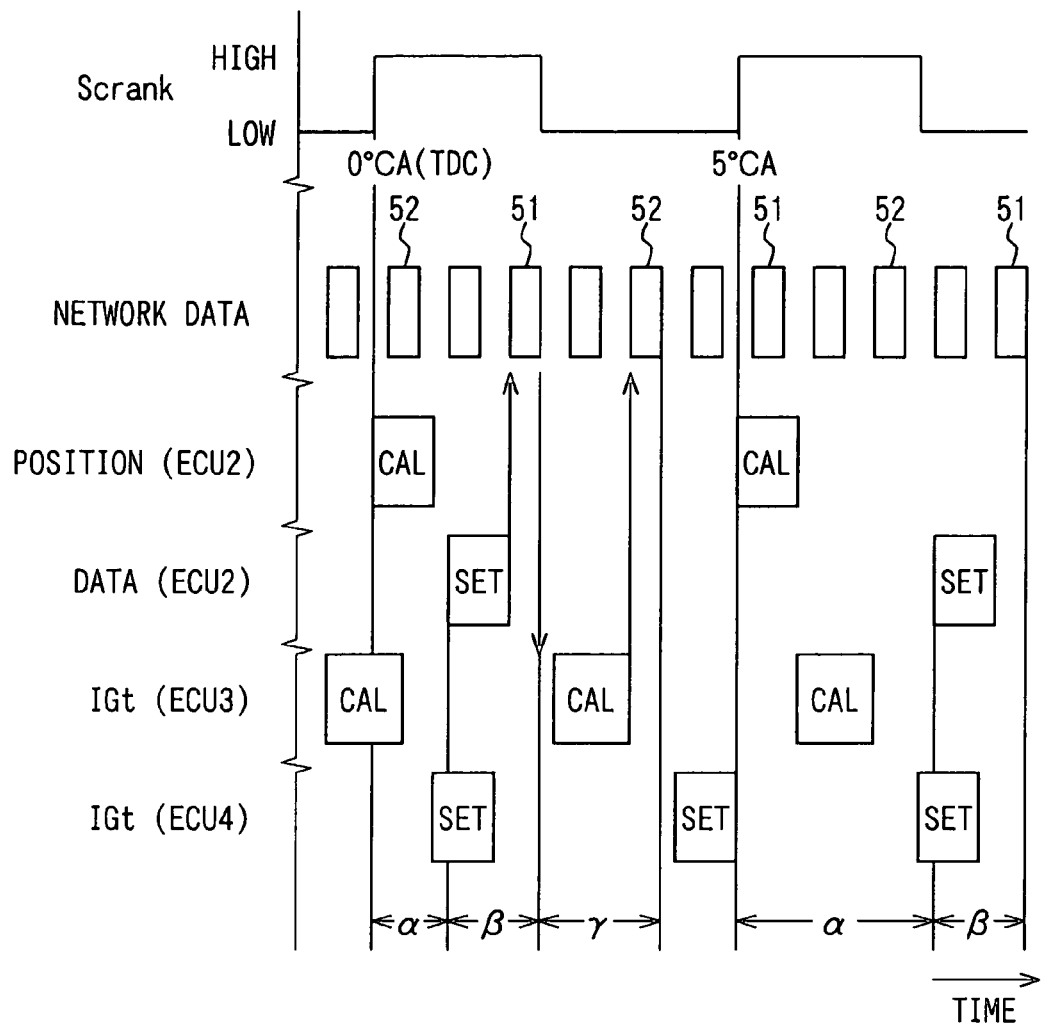
FIG. 2 is a timing diagram of an engine ignition control.

FIG. 2 schematically shows timing of an engine ignition control in the vehicle control system 1 having the above configuration. Data that pass through the intra-vehicle communication networks 8 are shown in the second part (from the top) of FIG. 2. In TDMA, time slots that are represented by rectangles in the second part of FIG. 2 are assigned in advance so as to be occupied by data to be sent from the respective ECUs connected to the intra-vehicle communication networks 8. In this embodiment, time slots 51 that appear in a fixed cycle are assigned to transmission from the sensor ECU 2 and time slots 52 that appear in the same cycle are assigned to transmission from the TCM ECU 3. The other slots are assigned to transmission from the other ECUs.

If a crankshaft signal that is output from the crankshaft sensor 5 has a timing relationship shown in the first part of FIG. 2 with the above arrangement of the time slots, the timing of engine ignition processing performed by the sensor ECU 2, the TCM ECU 3, and the ignition ECU 4 is as shown in the third to sixth parts of FIG. 2.

The operations of the sensor ECU 2, the TCM ECU 3, and the ignition ECU 4 will be described below by referring to FIG. 2 when necessary.

Figure 3:
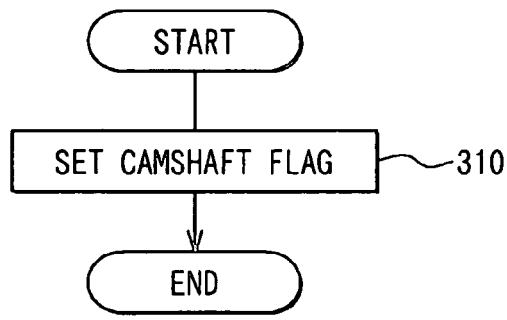
FIG. 3 is a flowchart of a camshaft signal rising process that is part of a crankshaft angle process.

FIG. 3 is a flowchart of a camshaft signal rising process that is part of the crankshaft angle process 25 of the sensor ECU 2. This process is started by an interrupt when the microcomputer 23 has detected a rise of a camshaft signal that is output from the camshaft sensor 6, that is, low-to-high switching of the camshaft signal. This process is finished after a flag is set in a prescribed area of the RAM at step 310. This flag will be referred to as a camshaft flag.

Figure 4:
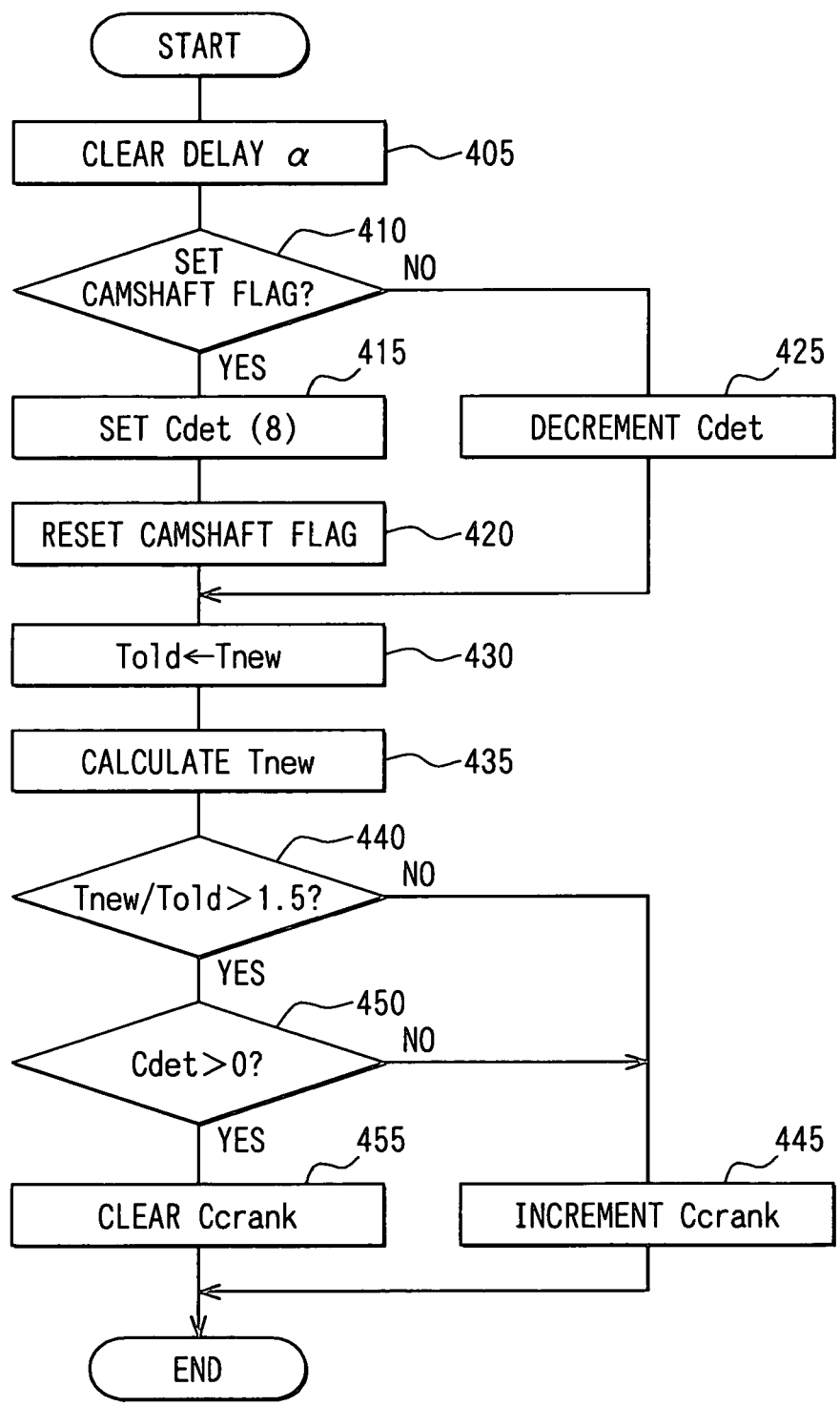
FIG. 4 is a flowchart of a crankshaft signal rising process that is also part of the crankshaft angle process.

FIG. 4 is a flowchart of a crankshaft signal rising process that is also part of the crankshaft angle process 25 of the sensor ECU 2. This process is started by an interrupt when the microcomputer 23 has detected a rise of a crankshaft signal that is output from the crankshaft sensor 5. This process is executed with the timing that is indicated by the rectangles in the third part of FIG. 2. This process will be described below with reference to FIG. 4.

Upon a start of this process, at step 405, a value α of a communication start delay measuring timer is cleared. The communication start delay measuring timer is a time that is counted all the time during operation of the CPU of the microcomputer 23. Since the value α of the timer is cleared, that is, made equal to 0, at this instant, the value α comes to represent an elapsed time from the immediately preceding rise of the crankshaft signal.

At step 410, whether the camshaft flag is set is determined by reading information stored in the prescribed area for the camshaft flag of the RAM. If the camshaft flag is set, the process proceeds to step 415.

If the camshaft flag is set, a variable called a determination counter is set in a prescribed area of the RAM at step 415 and the camshaft flag is reset (i.e., the setting of the camshaft flag is canceled) at step 420. The determination counter is a counter value (Cdet) for determining, when the microcomputer 23 has received a low level of the crankshaft signal corresponding to the toothless portion, whether the low level has occurred within a short time from the high level of the camshaft signal. When the determination counter is set, a natural number (e.g., 8) is used as an initial value.

If the camshaft flag is not set, the determination counter is decremented at step 425. That is, the value of the determination counter in the prescribed area of the RAM is replaced by a value obtained by decreasing the preceding value by 1.

After the execution of step 420 or 425, the process proceeds to step 430, where a value that is currently set as a variable Tnew is substituted into Told. At step 435, a time difference between the preceding rise of the crankshaft signal and its rise of this time is substituted into Tnew. The present time is stored in a prescribed area of the RAM. The time difference measurement is performed by determining the difference between a preceding rise time stored in a prescribed area of the RAM and the present time. At this instant, Tnew is equal to the time from the preceding rise of the crankshaft signal to its rise of this time and Told is equal to the second preceding rise of the crankshaft signal to its preceding rise.

At step 440, it is determined whether the ratio Tnew/Told is greater than a prescribed value, which is a threshold value to be used for determining whether the deviation between Tnew and Told corresponds to the toothless portion of the rotor that is attached to the crankshaft. In this embodiment, the prescribed value is set to 1.5, for example.

If Tnew/Told is smaller than or equal to the prescribed value, it is determined that the toothless portion did not come immediately before and the process proceeds to step 445, where the crankshaft counter is incremented. The process is then finished. The crankshaft counter is a value (Ccrank) indicating what number of teeth have come when measured from the crankshaft angle 0° CA to produce the crankshaft signal. That is, the crankshaft counter is an index indicating the current crankshaft angle uniquely.

If Tnew/Told is greater than the prescribed value, it is determined that the toothless portion came immediately before and the process proceeds to step 450, where it is determined whether the determination counter is positive or negative. If the determination counter is not positive, the process proceeds to step 445, where the crankshaft counter is incremented. The process is then finished. If the determination counter is positive, the process proceeds to step 455, where the crankshaft counter is cleared. The process is then finished.

Figure 5:
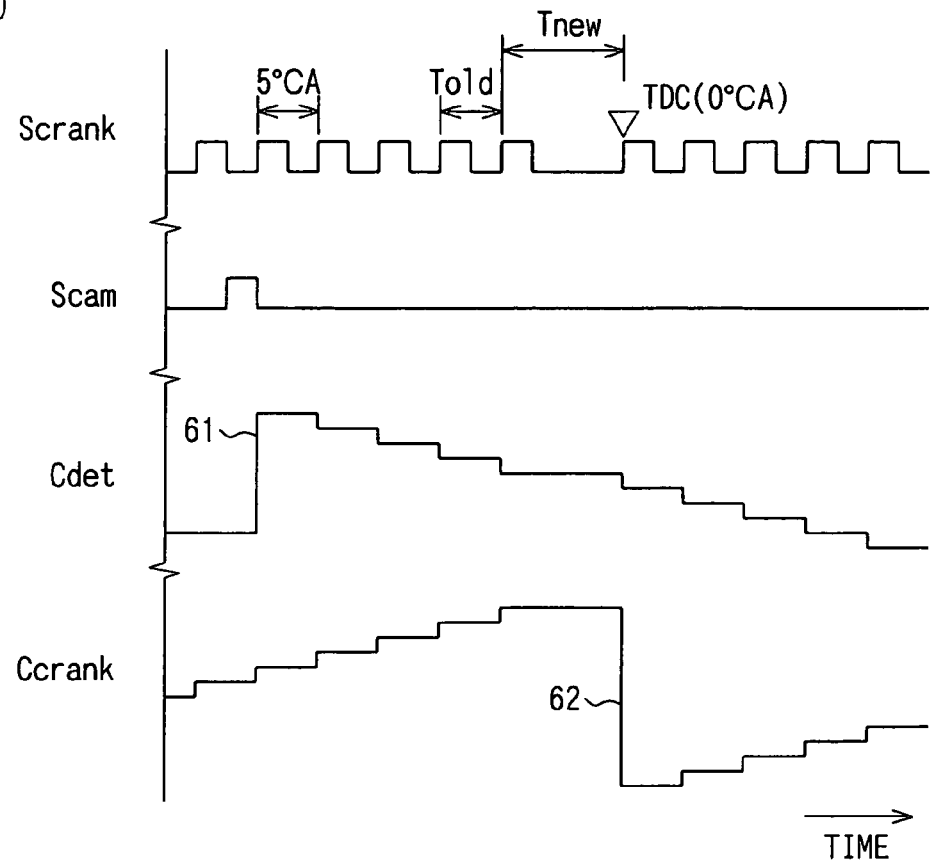
FIG. 5 is a timing chart showing variations of counts of a determination counter, a crankshaft counter, etc. vary.

The crankshaft counter is cleared at step 455 in a case that the determination results at both steps 440 and 450 are affirmative, that is, the toothless portion is detected in the crankshaft signal and the determination counter is positive. The meaning of this event will be described with reference to FIG. 5. FIG. 5 is a timing chart showing timing relationships between varying values of the above determination counter and crankshaft counter and the crankshaft signal and camshaft signal.

When the camshaft signal rises to the high level (FIG. 5), the camshaft flag is set at step 310 of FIG. 3. In the process of FIG. 4 that is started in response to an immediately subsequent rise of the crankshaft signal, at step 415 the determination counter is set to the prescribed value (timing 61). From this time onward, the process of FIG. 4 is started every time the crankshaft signal rises. Unless the camshaft signal rose immediately before, the camshaft flag is not set and hence the determination counter is decreased by 1 at step 425 of FIG. 4 every time the crankshaft signal rises. The crankshaft counter is increased by 1 at step 445 of FIG. 4 every time the crankshaft signal rises, unless the toothless portion is detected from the crankshaft signal and the determination counter is positive.

Then, if the toothless portion is detected from the crankshaft signal in a state that the determination counter is still greater than or equal to 2, the determination results at both steps 440 and 450 in the process of FIG. 4 should be positive and hence the crankshaft counter is cleared (timing 62). In this manner, when the toothless portion is detected from the crankshaft signal within a short time from a rise of the camshaft signal, the crankshaft counter is changed to 0 at the immediately subsequent rise (corresponding to 0° CA) of the crankshaft signal. This operation allows the crankshaft angle and the crankshaft counter to have a one-to-one corresponding relationship. In this embodiment, the term "within a short time from a rise of the camshaft signal" means within a time as measured from a rise of the camshaft signal during which the crankshaft signal rises a predetermined number of times. In this embodiment, the predetermined number is 8.

Figure 6:
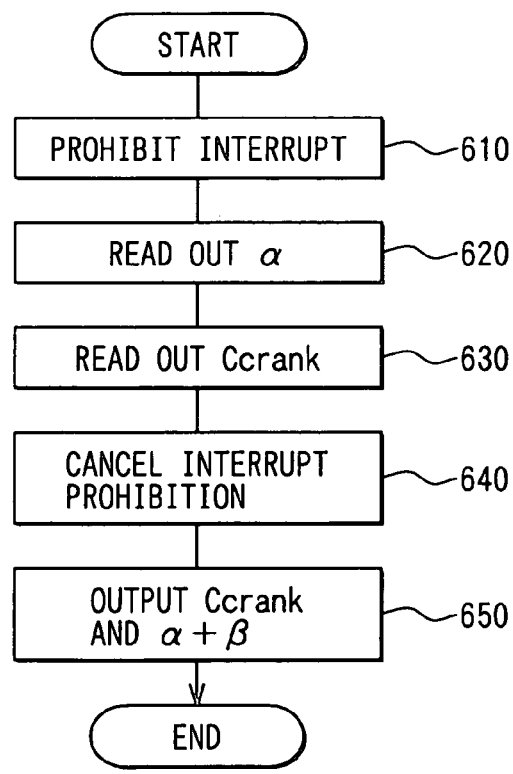
FIG. 6 is a flowchart of a crankshaft data setting and outputting process that is executed by the microcomputer.

FIG. 6 is a flowchart of a crankshaft data setting and outputting process that is executed by the microcomputer 23. A setting is made in advance so that this process is started in a prescribed cycle. In this embodiment, the predetermined cycle is the cycle of the rectangles shown in the fourth part of FIG. 2. It can also be said that this process is started a time $\beta$ before the end time of each time slot 51. The value $\beta$ is stored in the flash memory of the microcomputer 23 at the time of shipment from a factory, for example. The process of FIG. 6 will be described below.

At step 610, interrupt prohibition processing is performed. This is to delay a start of the process of FIG. 4 that is started by an interrupt in response to a rise of the crankshaft signal until interrupt prohibition is canceled. This is necessary because if the process of FIG. 4 were started by an interrupt during execution of the process of FIG. 6, the value $\alpha$ of the communication start delay measuring timer would be reset at step 405 of FIG. 4 and the time $\alpha$ (FIG. 2) from the immediately preceding rise of the crankshaft signal to the start of the process of FIG. 6 would become unknown.

At step 620, the timer value $\alpha$ that is stored in the RAM is read out. At step 630, the value of the crankshaft counter is read also from the RAM. At step 640, the interrupt prohibition is canceled. At step 650, a value $(\alpha+\beta)$ and the value of the crankshaft counter are output to the protocol IC 22 to prepare for outputting of these data to the TCM ECU 3 using a time slot 51. The value $(\alpha+\beta)$ represents a delay time of a communication etc. from the immediately preceding rise of the crankshaft signal to completion of outputting of the above data from the microcomputer 23 to the TCM ECU 3 (see FIG. 2). That is, it can be said that the value $(\alpha+\beta)$ is information relating to a crankshaft angle at a time point when the above data are sent from the sensor ECU 2 to the TCM ECU 3. Instead of the delay time information $(\alpha+\beta)$, a crankshaft angle that has been corrected on the basis of the delay time, such as a crankshaft angle after a lapse of the time $(\alpha+\beta)$, may be used.

The process is finished after the execution of step 650. The above data are thereafter sent by the protocol IC 22 to the TCM ECU 3 by using a time slot 51. Therefore, the transmission preparation processing of step 650 is substantially transmission processing.

In this manner, the data that are the value of the crankshaft counter and the delay time from the rise of the crankshaft signal to the completion of its outputting are sent to the TCM ECU 3.

Figure 7:
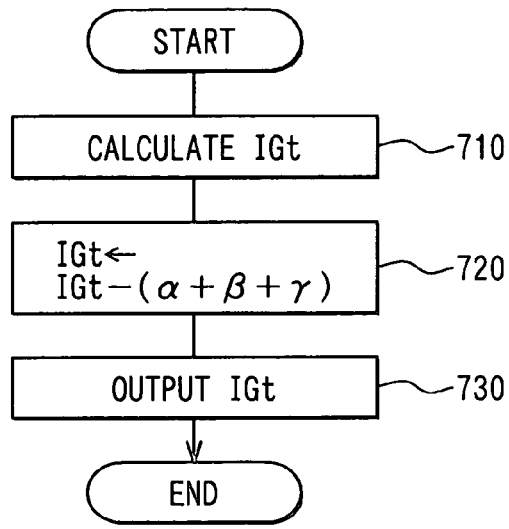
FIG. 7 is a flowchart of an ignition timing calculation process.

In the TCM ECU 3, the microcomputer 33 receives these data via the driver/receiver IC 31 and the protocol IC 32 and calculates an ignition timing (IGt) on the basis of the received data. FIG. 7 is a flowchart of this calculation process that is executed by the microcomputer 33. The ignition timing calculation process will be described with reference to FIG. 7.

A setting is made in advance so that the process of FIG. 7 is started in a prescribed cycle. In this embodiment, the predetermined cycle is the cycle of the rectangles shown in the fifth part of FIG. 2. This process is started and finished in the period from a time slot 51 and the time slot 52 that comes first after the time slot 51. That is, the process of FIG. 7 is performed in the period from a time slot 51 that is assigned to outputting of data from the sensor ECU 2 and the time slot 52 that comes first after the time slot 51. Therefore, a result of processing on data that are transmitted and received by using the time slot 51 can be sent by using the time slot 52 that comes first after the time slot 51: the delay time caused by a communication can be suppressed.

In the microcomputer 33, a time interval γ (FIG. 2) between each time slot 51 and the time slot 52 that comes first thereafter is stored in the flash memory in advance.

At step 710, an ignition timing (IGt), i.e., a delay time of ignition as measured from the present time, is calculated by performing extrapolation processing on the basis of the received crankshaft counter value. At this stage, the delay time thus calculated is such a value that a delay time due to a communication is not taken into consideration.

At step 720, the ignition timing obtained at step 710 is corrected for a delay due to a communication etc. More specifically, a time (α+β+γ) is subtracted from the ignition timing obtained at step 710. A value obtained by subtracting the time (α+β+γ) is information indicating a delay time of ignition as measured from an instant when the TCM ECU 3 sends ignition timing data to the ignition ECU 4. The ignition timing data that has been corrected at step 730 is output to the protocol IC 32, which prepares for outputting of this data to the ignition ECU 4 using the time slot 52. The process is finished after the execution of step 730. In this manner, the above data is sent to the ignition ECU 4 by the protocol IC 32 by using the time slot 52. Therefore, the transmission preparation processing of step 730 is substantially transmission processing.

Figure 8:
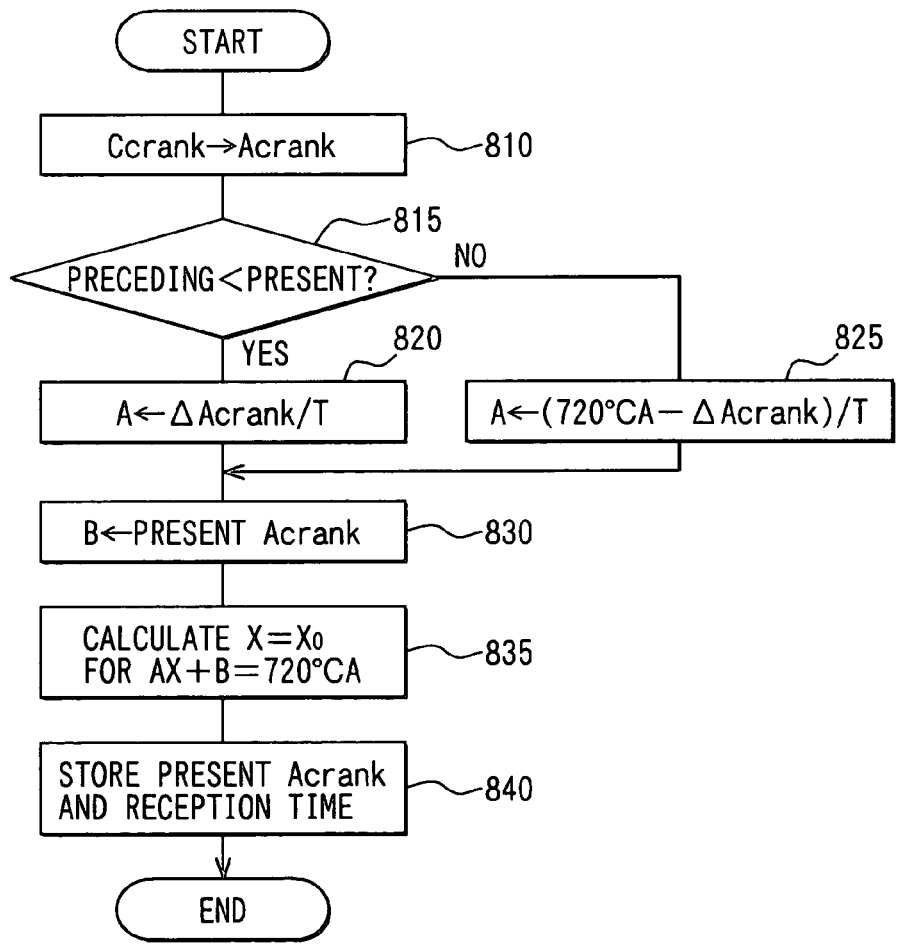
FIG. 8 is a flowchart of extrapolation processing for calculation of an ignition timing.
Figure 9:
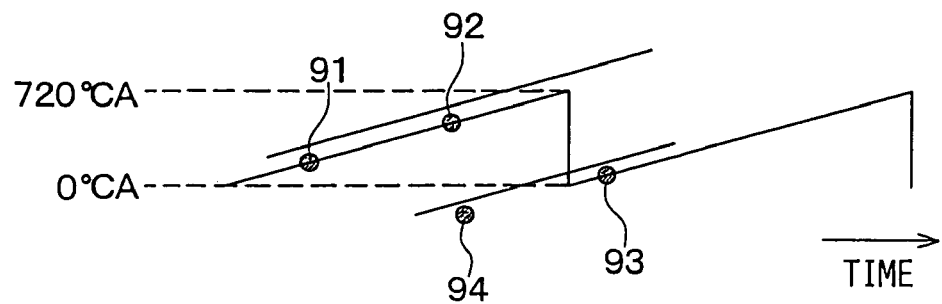
FIG. 9 is a conceptual diagram of linear extrapolation.

FIG. 8 is a flowchart showing the details of extrapolation processing that is performed at step 710. This extrapolation is linear extrapolation using a crankshaft counter value that was received immediately before the present time and a crankshaft counter value that was received one time before it. FIG. 9 is a conceptual diagram of this linear extrapolation. In FIG. 9, the vertical direction corresponds to the crankshaft angle, a folded line represents a temporal variation of the crankshaft angle, and discrete points 91–93 represent crankshaft angles corresponding to crankshaft counter values received by the microcomputer 33. Usually, the crankshaft angle increases with time and returns to 0° CA upon reaching 720° CA.

For example, if the crankshaft angle received this time has the value of point 92, a time when the crankshaft angle will become 720° CA, that is, an ignition timing, is calculated by extrapolating the straight line passing through point 91 representing a crankshaft angle received one time before and point 92 of this time.

If the crankshaft angle received this time has the value of point 93, an ignition timing is calculated by extrapolating, rather than the straight line passing through point 92 representing a crankshaft angle received one time before and point 93, the straight line passing through point 93 and point 94 that is obtained by lowering point 92 by 720°. This extrapolation processing will be described below with reference to FIG. 8.

First, at step 810, a received crankshaft counter value (Ccrank) is converted into a crankshaft angle (Acrank). A conversion table for this purpose is stored in the flash memory of the microcomputer 33. Step 810 is executed by reading this conversion table.

At step 815, it is determined whether a crankshaft angle corresponding to a crankshaft counter value that was received one time before (i.e., a preceding crankshaft counter value) is smaller than the crankshaft angle obtained presently at step 810. The crankshaft counter value that was received one time before is stored in the flash memory of the microcomputer 33.

If the determination result is affirmative, at step 820 a value ΔAcrank/T is substituted into variable A that is assigned to a prescribed area of the flash memory. Here, ΔAcrank means a difference {(present Acrank)−(preceding Acrank)}, and T means a communication interval. This corresponds to the extrapolation that is performed in the case that the crankshaft angle received this time corresponds to point 92 in FIG. 9. The "communication interval T" is a time interval between the time of reception of the preceding crankshaft angle and the time of reception of the crankshaft angle of this time. If the determination result at step 815 is negative, at step 825 a value (720°−ΔAcrank)/T is substituted into variable A. This corresponds to the extrapolation that is performed in the case that the crankshaft angle received this time corresponds to point 93 in FIG. 9.

After the execution of step 820 or 825, at step 830 the crankshaft angle of this time is substituted into variable B that is assigned to a prescribed area of the flash memory.

At step 835, $x=x_0$ that satisfies Ax+B=720° CA is calculated for A and B that were obtained at steps 820–830, where x is the elapsed time from the reception time of the crankshaft angle of this time. The formula Ax+B represents a straight line obtained by the extrapolation, that is, represents the crankshaft angle at the time x. Therefore, $x_0$ is a time that is needed for the crankshaft angle to reach 720° CA from the reception time of the crankshaft angle of this time. That is, an ignition timing that is obtained by the extrapolation is the time $x_0$.

At step 840, the crankshaft angle of this time and the reception time of the crankshaft angle of this time are stored in the flash memory so as to be used as a preceding crankshaft angle and a preceding reception time, respectively.

Figure 10A:
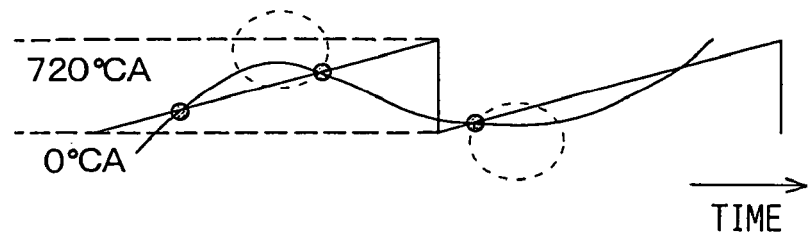
FIGS. 10A and 10B are conceptual diagrams of other kinds of extrapolation.
Figure 10B:
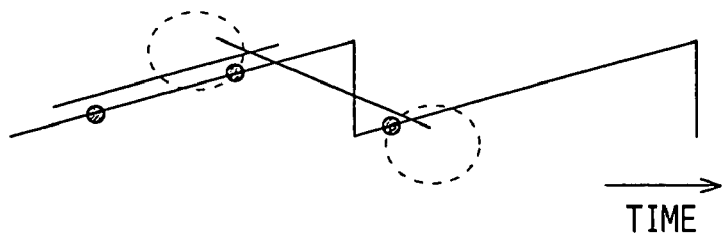

The above extrapolation processing has sufficiently high accuracy because the engine rotation speed does not vary quickly relatively to the resolution of the crankshaft counter (in this embodiment, 5°). Further, this extrapolation is free of an overshoot and undershoot (enclosed by broken lines in FIG. 10A) that occur in the case of quadratic extrapolation shown in FIG. 10A and an error due to discontinuity between crankshaft angles 720° CA and 0° CA.

The ignition timing data that have been sent to the ignition ECU 4 as a result of the execution of the processes of FIGS. 7 and 8 are received by the microcomputer 43 via the driver/receiver IC 41 and the protocol IC 42. The ignition process 45 causes output of an ignition instruction to the I/O 44 at the received ignition timing, and the I/O 44 outputs an ignition signal to the igniter 7.

As described above, the sensor ECU 2 sends the calculated crankshaft counter value to the intra-vehicle communication networks 8 by executing the crankshaft data setting and outputting process of FIG. 6, as a result of which the crankshaft angle information goes through the networks 8. Therefore, even if crankshaft angle information that has been sent is lost because of problems relating to communication rates etc., the control can be performed properly by using the crankshaft counter value that is sent next time and hence the temporal deviation between the control on the igniter 7 and the crankshaft angle can be suppressed.

Information relating to the crankshaft angle at an instant of outputting by the sensor ECU 2 is passed from the sensor ECU 2 to the TCM ECU 3 and the TCM ECU 3 gives the ignition ECU 4 information indicating a delay time of ignition as measured from outputting of data from the TCM ECU 3 to the ignition ECU 4. Therefore, the delay time caused by a communication can be suppressed and the temporal deviation between the control on the igniter 7 and the crankshaft angle can further be suppressed.

(Second Embodiment)

Figure 11:
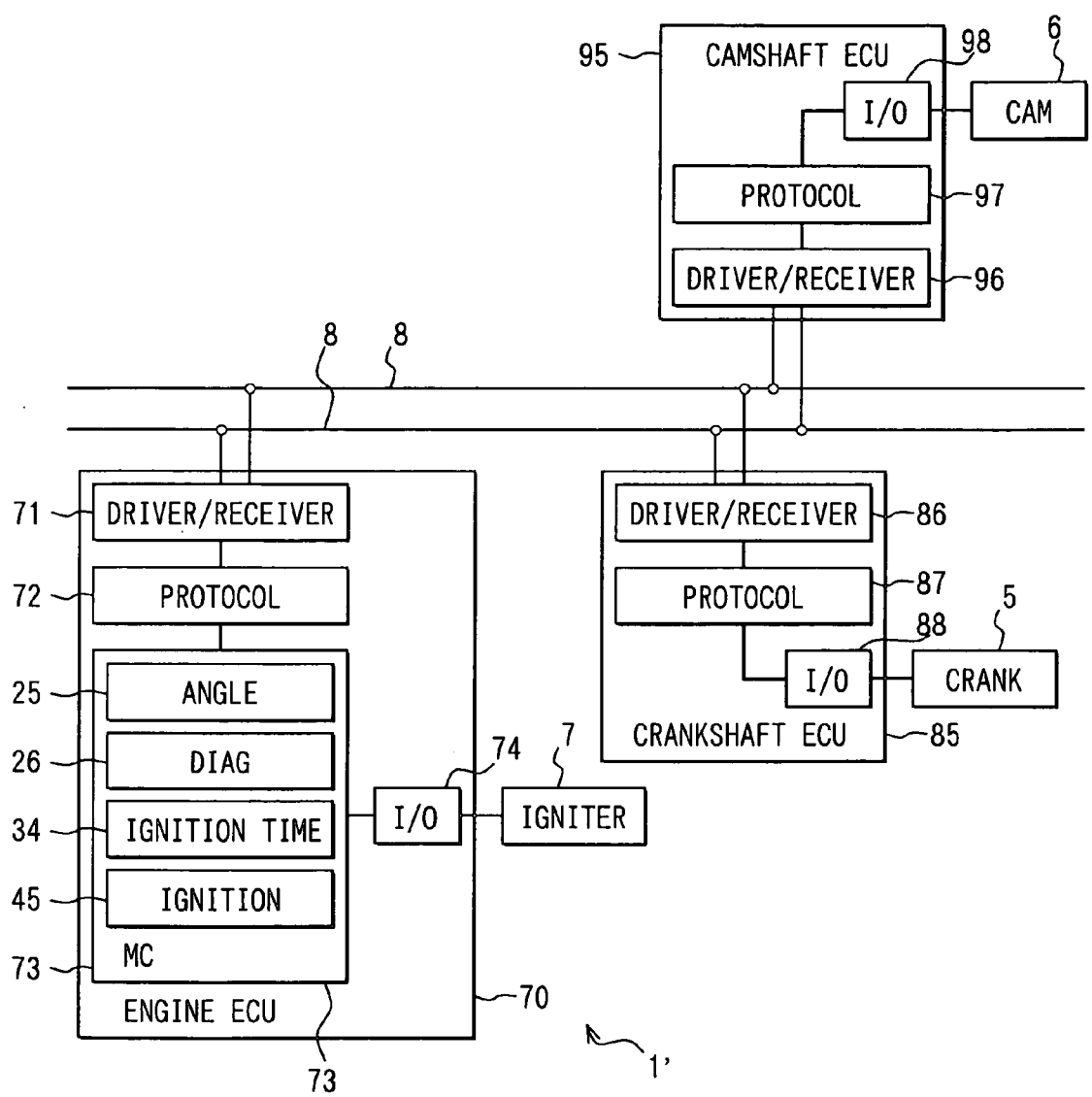
FIG. 11 shows a vehicle control system 1 according to a second embodiment of the invention.
Figure 12:
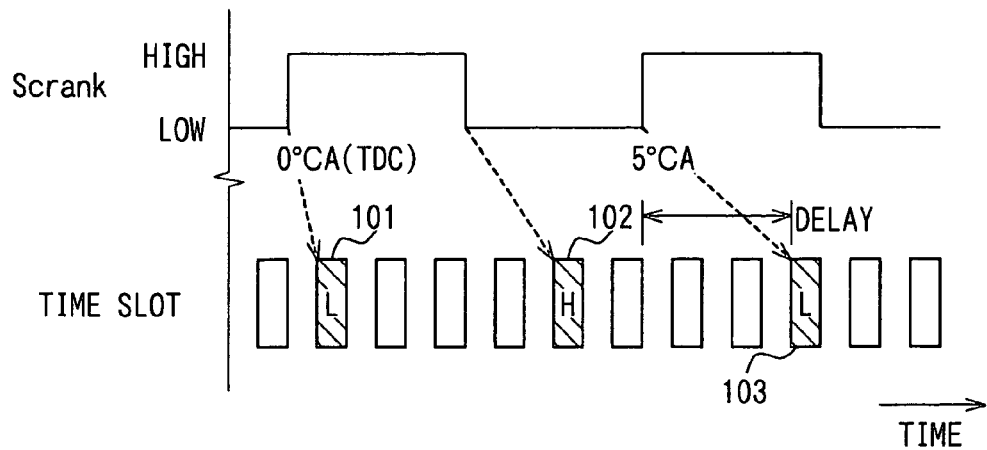
FIG. 12 shows a time relationship between a crankshaft signal and information that relates to the crankshaft signal and is sent to an intra-vehicle communication network in a prior art.
Figure 13:
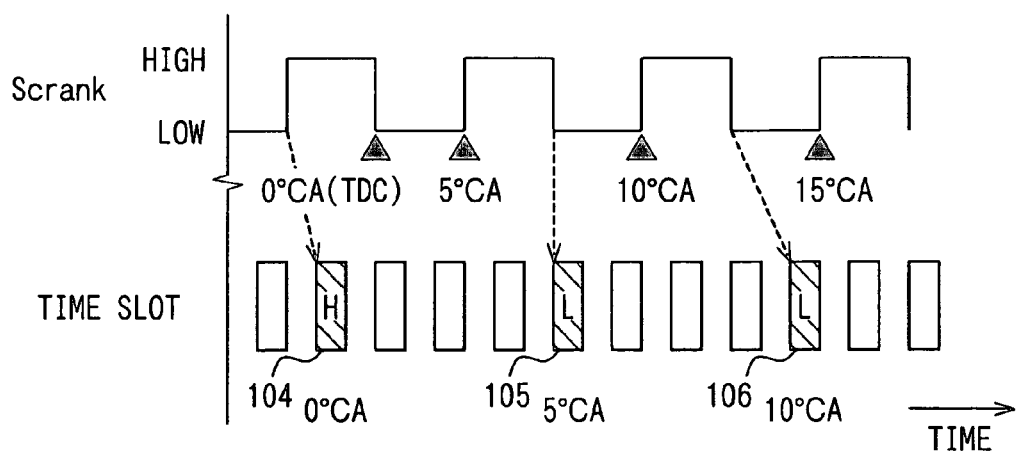
FIG. 13 shows a relationship between the crankshaft signal and time slots in a case that the engine rotation speed is higher than in the case of FIG. 12 in the prior art.

A second embodiment of the invention will be described below. FIG. 11 shows a vehicle control system 1' according to the second embodiment of the invention. In this embodiment, it is assumed that the TDMA communication period of the intra-vehicle communication networks 8 is sufficiently short. The term "the TDMA communication period is sufficiently short" means that the communication period for each ECU is shorter than ½ of the shortest period of variation of the crankshaft signal.

The vehicle control system 1' has a crankshaft sensor 5, a camshaft sensor 6, an igniter 7, an engine ECU 70, a crankshaft ECU 85, and a camshaft ECU 95. Components of this embodiment having equivalent components in the first embodiment will be given the same reference numerals as the latter and descriptions thereof may be simplified or omitted.

The crankshaft ECU 85 has a driver/receiver IC 86, a protocol IC 87, and an I/O 88. The crankshaft signal received from the crankshaft sensor 5 is processed by the I/O 88, the protocol IC 87, and the driver/receiver IC 86 and sent to the engine ECU 70 as data of a crankshaft signal that comply with the protocol of the intra-vehicle communication networks 8.

The camshaft ECU 95 has a driver/receiver IC 96, a protocol IC 97, and an I/O 98. The camshaft signal received from the camshaft sensor 6 is processed by the I/O 98, the protocol IC 97, and the driver/receiver IC 96 and sent to the engine ECU 70 as data of a camshaft signal that comply with the protocol of the intra-vehicle communication networks 8.

The data of the camshaft signal and the crankshaft signal that are sent in the above manners are different from a crankshaft counter value that is sent to the intra-vehicle communication networks 8 in the first embodiment, that is, the data are relative information indicating a variation of the crankshaft angle rather than information indicating a crankshaft angle itself. In this embodiment, since the communication period is sufficiently short, transmission data are not lost because of too short variation periods of the camshaft signal and the crankshaft signal.

The engine ECU 70 is composed of a driver/receiver IC 71, a protocol IC 72, a microcomputer 73, and an I/O 74. The microcomputer 73 receives, via the driver/receiver IC 71 and the protocol IC 72, data that are transmitted via the intra-vehicle communication networks 8, and controls the ignition by the igniter 7 via the I/O 74.

The microcomputer 73 executes a crankshaft angle process 25, a diagnostic process 26, an ignition timing process 34, and an ignition process 45. These processes are equivalent to the corresponding processes in the first embodiment. However, data are exchanged between the diagnostic process 26, the ignition timing process 34, and the ignition process 45 without intervention of the intra-vehicle communication networks 8. Therefore, $\alpha$, $\beta$, and $\gamma$ in FIGS. 6 and 7 are processing delays rather than delays due to communications.

In the vehicle control system 1' having the above configuration, the TDMA communication period of the intra-vehicle communication networks 8 is sufficiently short. That is, the intra-vehicle communication networks 8 allow the crankshaft ECU 85 to transmit information based on the received crankshaft signal without losing it. Therefore, the temporal deviation between the control timing of the igniter 7 and the crankshaft angle can be suppressed.

(Third Embodiment)

Figure 14:
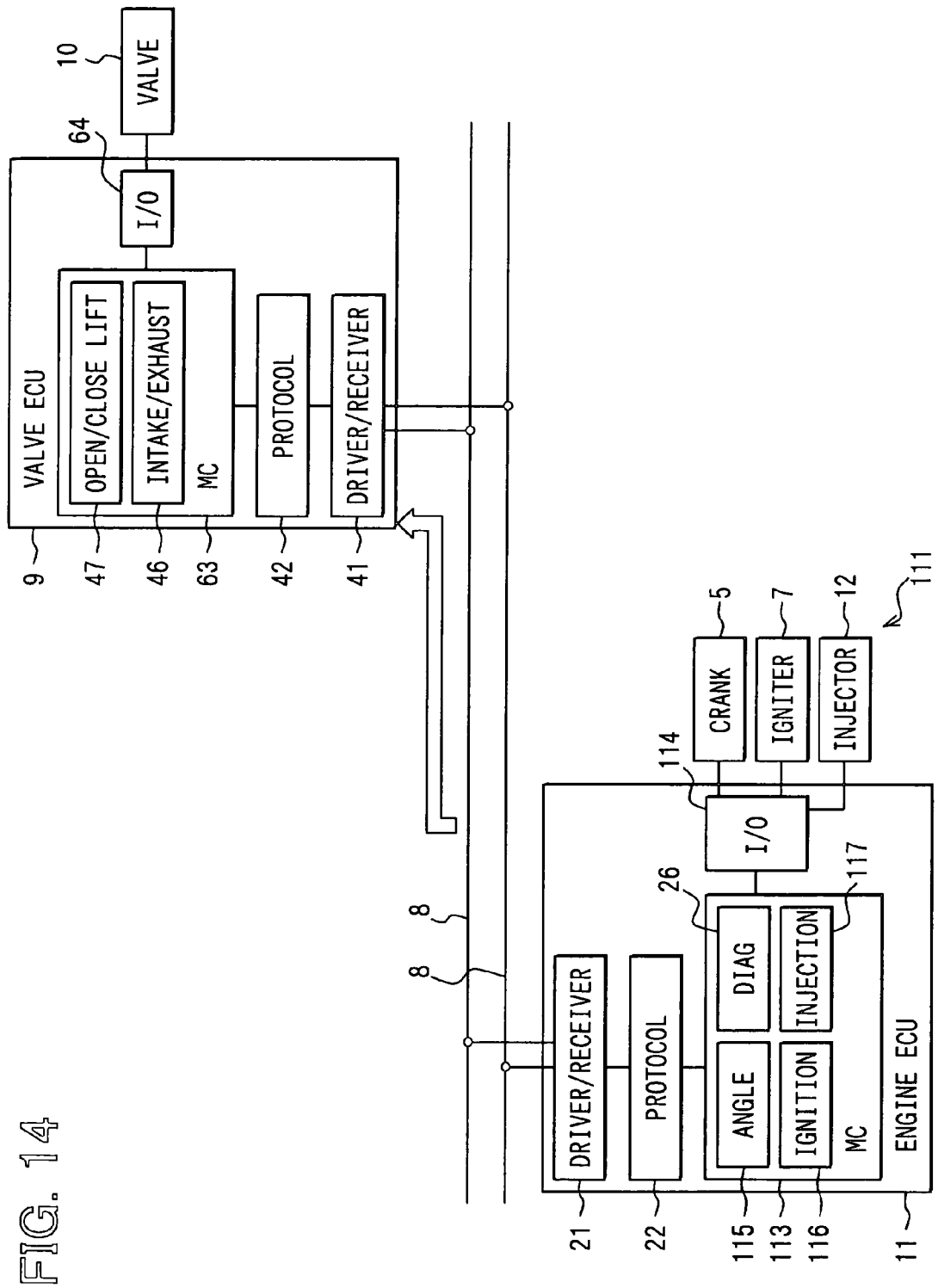
FIG. 14 shows a vehicle control system according to a third embodiment of the invention.

Next, a third embodiment of the invention will be described. FIG. 14 shows a vehicle control system 111 according to this embodiment. The vehicle control system 111 is composed of an electromagnetic valve ECU 9, an engine ECU 11, a crankshaft sensor 5, igniters 7, electromagnetic valves 10, injectors 12, intra-vehicle communication networks 8, and ECUs (not shown) for controlling other vehicle functions that are connected to the intra-vehicle communication networks 8.

Components in FIG. 14 that are given the same reference numerals as corresponding components in FIG. 1 (first embodiment) have the same functions as the latter and will not be described below in detail.

The engine ECU 11 has a driver/receiver IC 21, a protocol IC 22, a microcomputer 113, and an I/O 114.

The I/O 114 waveform-shapes an analog signal that is received from the crankshaft sensor 5. When receiving ignition instruction data from the microcomputer 113, the I/O 114 outputs ignition control signals to the igniters 7 for engine ignition that are provided in the number of cylinders. When receiving fuel injection instruction data from the microcomputer 113, the I/O 114 outputs injection control signals to injectors 12 for fuel injection that are provided in the number of cylinders.

The microcomputer 113 has a CPU, RAM, and a flash memory (not shown). The CPU performs various kinds of processing by reading programs stored in the flash memory and executing those. If necessary, the microcomputer 113 writes or reads data to or from the RAM. If it is necessary to communicate with another ECU, the microcomputer 113 receives data from the protocol IC 22 or outputs, to the protocol IC 22, data to be transmitted. Examples of processes to be executed by the microcomputer 113 are a crankshaft angle process 115, an ignition control process 116, an injection control process 117, and a diagnostic process 26.

The crankshaft angle process 115 calculates a crankshaft counter value on the basis of an output of the crankshaft sensor 5. The details of the crankshaft angle process 115 will be described later.

The ignition control process 116 calculates ignition timings of the igniters 7 on the basis of the crankshaft counter value calculated by the crankshaft angle process 115, and performs ignition controls on the igniters 7 at the calculated ignition timings.

The injection control process 117 calculates injection timings of the injectors 12 for fuel injection on the basis of the crankshaft counter value calculated by the crankshaft angle process 115, and performs injection controls on the injectors 12 at the calculated ignition timings.

The electromagnetic valve ECU 9 has a driver/receiver IC 41, a protocol IC 42, a microcomputer 63, and an I/O 64.

When receiving a signal for electromagnetic valve control from the microcomputer 63, the I/O 64 outputs currents base on the received data to the electromagnetic valves 10 that are provided in the number of cylinders.

The microcomputer 63 has a CPU, a RAM, and a flash memory (not shown). The CPU performs various kinds of processing by reading programs stored in the flash memory and executing those. If necessary, the microcomputer 63 writes or reads data to or from the RAM. If it is necessary to communicate with another ECU, the microcomputer 63 receives data from the protocol IC 42 or outputs, to the protocol IC 42, data to be transmitted. Examples of processes to be executed by the microcomputer 63 are a suction/exhaust calculation process 46 and an opening/closing timing and lift amount calculation process 47.

Figure 15:
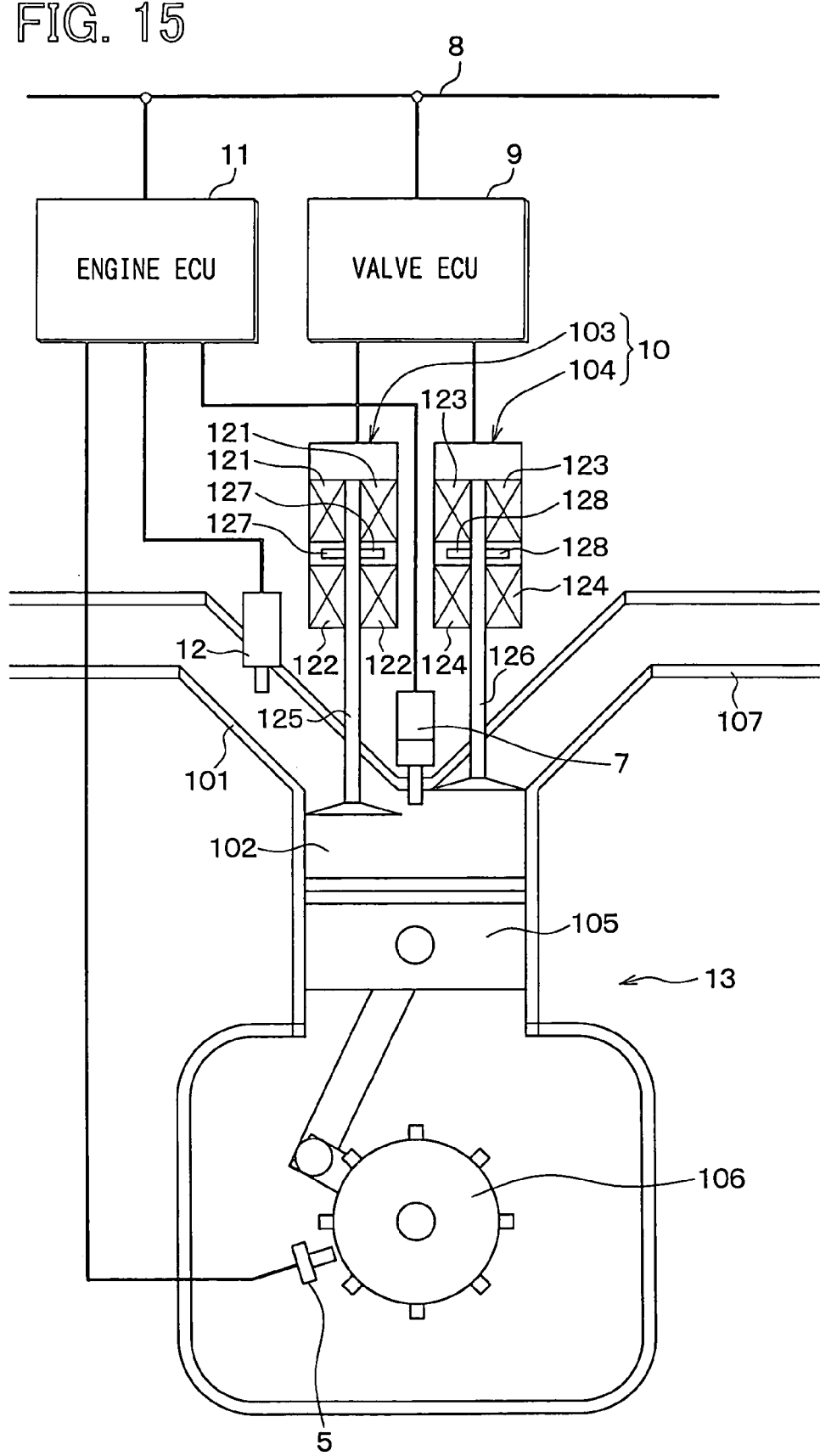
FIG. 15 is a schematic view of an engine that is controlled by the vehicle control system.

FIG. 15 is a schematic view of one cylinder of an engine 13 that is controlled by the vehicle control system 111 according to this embodiment. Air that is necessary for combustion of the engine 13 is mixed, in an intake pipe 101, with fuel that is injected with a control on the injector 12 by the injection control process 117 of the microcomputer 113, whereby a mixture is produced. The mixture is supplied to a combustion chamber 102 via the intake pipe 101. In the combustion chamber 102, the mixture is compressed by a piston 105 and then explodes and burns upon ignition by the igniter 7. Resulting explosion force causes the piston 105 and the crankshaft to generate motive force. The ignition timing of the igniter 7 is determined by the ignition control process of the microcomputer 113. The burnt mixture, i.e., exhaust gas, is exhausted outside via an exhaust manifold 107.

The electromagnetic valve 10 is composed of an intake valve 103 and an exhaust valve 104. The intake valve 103 has an upper coil 121, a lower coil 122, a valve body 125, a plunger 127, etc.

When lowered, the valve body 125 opens an in flow port through which a mixture is to be introduced into the combustion chamber 102 from the intake pipe 101 of the engine 13. The valve body 125 closes the inflow port when elevated.

The plunger 127 is a disc-shaped member made of a soft magnetic material and is fixed to the shaft of the valve body 125.

The upper coil 121 and the lower coil 122, which generate a magnetic field when energized, are disposed over and under the plunger 127, respectively.

The valve body 125 is supported movably in its axial direction by means of a spring (not shown). When neither the upper coil 121 nor the lower coil 122 is energized, the plunger 127 is located at the center of the space between the upper coil 121 and the lower coil 122 (i.e., a neutral position). When the plunger 127 is located at the neutral position, the valve body 125 is located at the center between the position where the inflow port is fully opened and the position where the inflow port is closed completely.

In the intake valve 103 having the above structure, when a current flows through the upper coil 121, a magnetic field is generated and the plunger 127 receives upward electromagnetic force. When a current flows through the lower coil 122, a magnetic field is generated and the plunger 127 receives downward electromagnetic force. Therefore, by causing currents to flow through the upper coil 121 and the lower coil 122 alternately, the plunger 127 can be reciprocated in the vertical direction, that is, the valve body 127 can be moved alternately in the port opening direction and the port closing direction. The magnitude of the displacements of the valve body 127 varies depending on the magnitude of the currents that flow through the upper coil 121 and the lower coil 122.

The exhaust valve 104 has an upper coil 123, a lower coil 124, a valve body 126, a plunger 128, etc. The exhaust valve 104 has the same structure and operates in the same manner as the intake valve 103 does. The upper coil 123, the lower coil 124, the valve body 126, and the plunger 128 of the exhaust valve 104 correspond to the upper coil 121, the lower coil 122, the valve body 125, and the plunger 127 of the intake valve 103, respectively. The valve body 126 opens and closes an outflow port between the combustion chamber 102 and the exhaust manifold 107.

The supply timing and the supply amount of a mixture that is supplied from the intake pipe 101 to the combustion chamber 102 are determined by the opening/closing timing and the lift amount of the intake valve 103. The exhaust timing and the exhaust amount of a burnt mixture to be exhausted from the combustion chamber 102 to the exhaust manifold 107 are determined by the opening/closing timing and the lift amount of the exhaust valve 104. The valve opening/closing timing means valve opening timing and a time during which the valve is opened. The valve lift amount means a length of lowering of the valve body 125 or 126.

In the above electromagnetic valve 10, to open and close the intake valve 103 and the exhaust valve 104, that is, to lower and elevate the valve bodies 125 and 126, in many cases large currents need to be supplied from the electromagnetic valve ECU 9 to the upper coils 121 and 123 and the lower coils 122 and 124. In this connection, in this embodiment, the electromagnetic valve ECU 9 is provided separately from the other ECUs (e.g., engine ECU 11) for controlling actuators and sensors. Since the electromagnetic valve ECU 9 can be provided away from the other ECUs, electromagnetic noise that is exerted by the electromagnetic valve ECU 9 on the other ECUs can be reduced.

Figure 16:
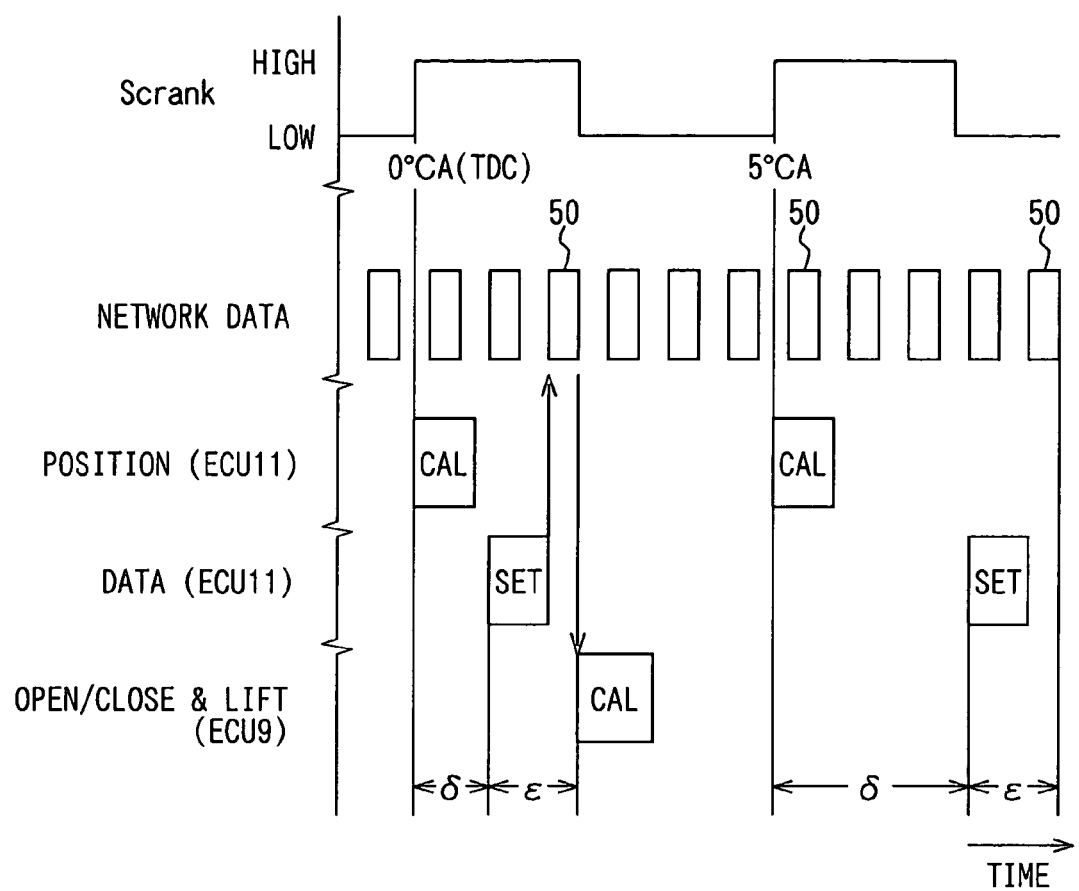
FIG. 16 schematically shows suction/exhaust timing of the engine using an electromagnetic valve shown in FIG. 10.

FIG. 16 schematically shows suction/exhaust timing of the engine 13 using the electromagnetic valve 10 in the vehicle control system 111 having the above configuration. The second part (from the top) of FIG. 16 shows the timing of data that pass through the intra-vehicle communication networks 8. In TDMA, each of time slots represented by the rectangles shown in the second part is assigned to transmission from one of the ECUs so as to be occupied by it. In this embodiment, time slots 50 that appear in a prescribed cycle are assigned to transmission from the engine ECU 11.

If a crankshaft signal that is output from the crankshaft sensor 5 varies with the timing shown in the first part of FIG. 16 for the above arrangement of the time slots, the timing of engine ignition processing performed by the engine ECU 11 and the magnetic valve ECU 9 becomes as shown in the third to fifth parts.

The operations of the engine ECU 11 and the magnetic valve ECU 9 will be described below with reference to FIG. 16.

Figure 17:
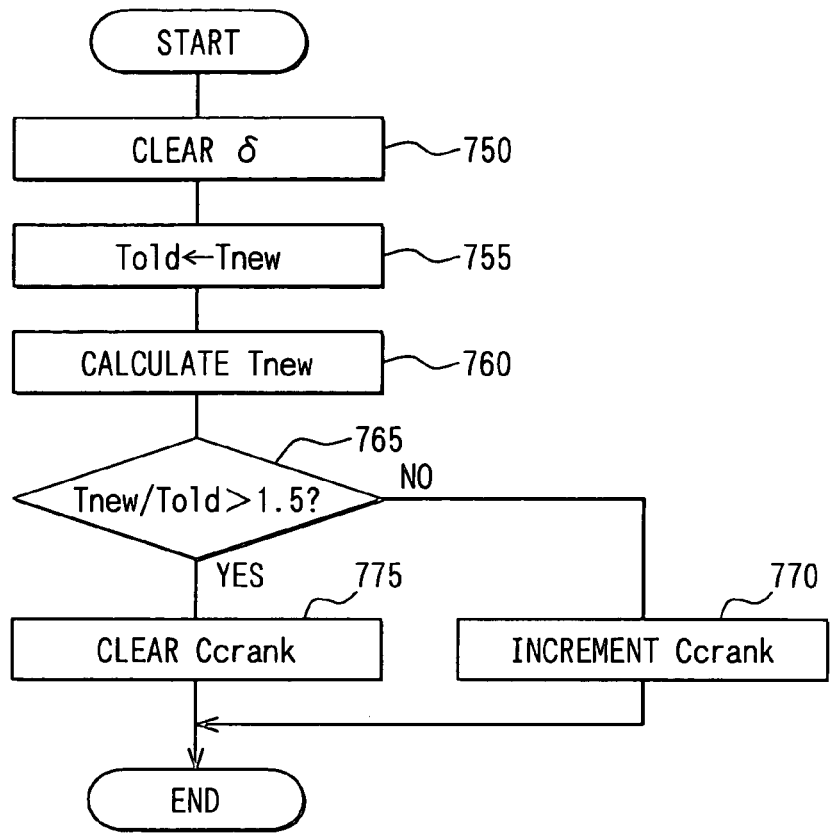
FIG. 17 is a flowchart showing a crankshaft signal rising process.

FIG. 17 is a flowchart showing a crankshaft signal rising process as part of the crankshaft angle process 115 of the engine ECU 11. This process is started by an interrupt when the microcomputer 113 has detected a rise of a crankshaft signal (Scrank) that is output from the crankshaft sensor 5. This process is performed with the timing that is indicated by the rectangles shown in the third part of FIG. 16. This process will be described below with reference to FIG. 17.

Upon a start of this process, at step 750, a value δ of a communication start delay measuring timer is cleared. The communication start delay measuring timer is a time that is counted all the time during operation of the CPU of the microcomputer 113. Since the value δ of the timer is made equal to 0, at this instant, the value δ comes to represent an elapsed time from the immediately preceding rise of the crankshaft signal.

At step 755, a value that is currently set as a variable Tnew is substituted into Told. At step 760, a time difference between the preceding rise of the crankshaft signal and its rise of this time is substituted into Tnew. The present time is stored in a prescribed area of the RAM. The time difference measurement is performed by determining the difference between a preceding rise time stored in a prescribed area of the RAM and the present time. At this instant, Tnew is equal to the time from the preceding rise of the crankshaft signal to its rise of this time and Told is equal to the second preceding rise of the crankshaft signal to its preceding rise.

At step 765, it is determined whether the ratio Tnew/Told is greater than a prescribed value, which is a threshold value to be used for determining whether the deviation between Tnew and Told corresponds to the toothless portion of the rotor that is attached to the crankshaft. In this embodiment, the prescribed value is set to 1.5, for example.

If Tnew/Told is smaller than or equal to the prescribed value, it is determined that the toothless portion did not come immediately before and the process proceeds to step 770, where a crankshaft counter is incremented. The process is then finished. As in the case of the first and second embodiments, the crankshaft counter is a value (Ccrank) indicating what number of teeth have come when measured from the crankshaft angle 0° CA to produce the crankshaft signal.

If Tnew/Told is greater than the prescribed value, it is determined that the toothless portion came immediately before and the process proceeds to step 775, where the crankshaft counter is cleared.

The crankshaft counter is cleared at step 775 in a case that the determination result at step 765 is affirmative, that is, the toothless portion is detected in the crankshaft signal. Therefore, if the toothless portion is detected in the crankshaft signal, the crankshaft counter is made 0 at the immediately subsequent rise of the crankshaft signal (corresponds to 0° CA or 360° CA). Since the crankshaft counter is cleared every 360°, it can indicate the rotation angle (0° CA to 360° CA) of the crankshaft uniquely. With only the crankshaft counter, whether the crankshaft angle is in the range of 0° CA to 360° CA or in the range of 360° CA to 720° CA cannot be determined.

Figure 18:
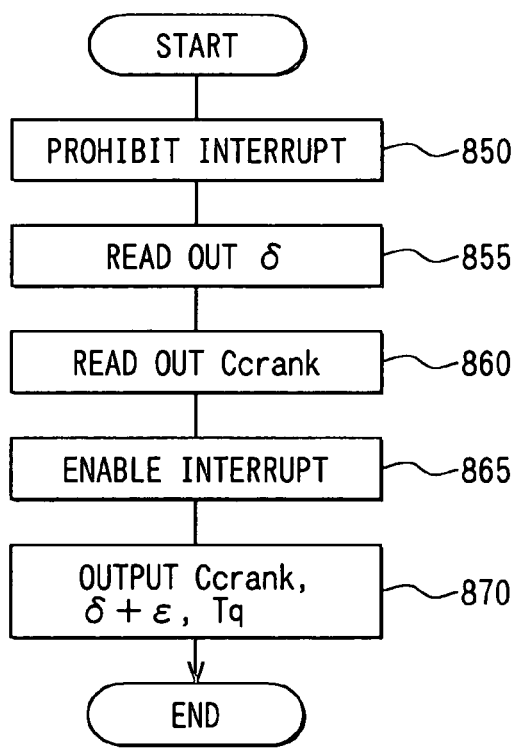
FIG. 18 is a flowchart of a crankshaft data setting and outputting process that is executed by a microcomputer in the third embodiment.

FIG. 18 is a flowchart of a crankshaft data setting and outputting process that is executed by the microcomputer 113. A setting is made in advance so that this process is started in a prescribed cycle. In this embodiment, the predetermined cycle is the cycle of the rectangles shown in the fourth part of FIG. 16. A value $\epsilon$ is stored in the flash memory of the microcomputer 113 at the time of shipment from a factory, for example.

Steps 850, 855, 860, and 865 of FIG. 18 correspond to steps 610, 620, 630, and 640 of FIG. 6, respectively. The value $\alpha$ in FIG. 6 should be read as a value $\delta$ in FIG. 18. That is, interrupt prohibition processing is performed at step 610, a timer value $\alpha$ is read out at step 866, a crankshaft counter value is read out at step 860, and the interrupt prohibition is canceled at step 865 to enable interrupt.

At step 870, a torque value (Tq) that is currently necessary for the vehicle, that is, a required torque value, is calculated on the basis of accelerator position information that is received via the driver/receiver IC 21 and the protocol IC 22. An accelerator position is detected by an accelerator position sensor that is connected to an ECU that is connected to the intra-vehicle communication networks 8 and is not shown in FIG. 14 and that ECU sends accelerator position information to the intra-vehicle communication networks 8.

At step 870, a value ($\delta+\epsilon$), the crankshaft counter value, and the required torque value are output to the protocol IC 22 to prepare for outputting of these data to the electromagnetic valve ECU 9 using a time slot 50.

The value ($\delta+\epsilon$) represents a delay time of a communication etc. from the immediately preceding rise of the crankshaft signal to completion of outputting of the above data from the microcomputer 113 to the electromagnetic valve ECU 9 (FIG. 16). That is, it can be said that the value ($\delta+\epsilon$) is information relating to a crankshaft angle at a time point when the above data are sent from the engine ECU 11 to the electromagnetic valve ECU 9. Instead of the delay time information ($\delta+\epsilon$), a crankshaft angle that has been corrected on the basis of the delay time, such as a crankshaft angle after a lapse of the time ($\delta+\epsilon$), may be used.

The process is finished after the execution of step 870. The above data are thereafter sent by the protocol IC 22 to the electromagnetic valve ECU 9 by using a time slot 50. Therefore, the transmission preparation processing of step 870 is substantially transmission processing.

In this manner, the data that are the crankshaft counter value, the delay time from the rise of the crankshaft signal to the completion of its outputting, and the required torque value are sent to the electromagnetic valve ECU 9.

Figures 19, 20:
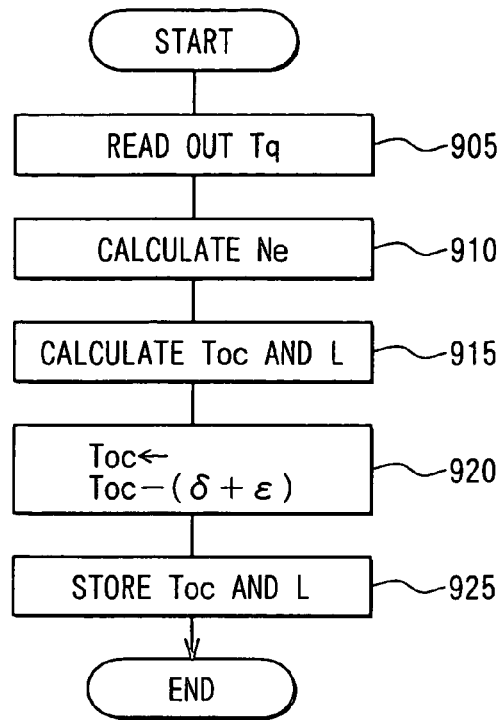
FIG. 19 is a flowchart of an opening/closing timing and lift amount calculation process that is executed by a microcomputer.
FIG. 20 shows exemplary opening/closing timing of intake valves and exhaust valves in a case that the engine has four cylinders.

In the electromagnetic valve ECU 9, the microcomputer 63 receives these data via the driver/receiver IC 41 and the protocol IC 42 and calculates opening/closing timing and lift amounts of the intake valve 103 and the exhaust valve 104 of each electromagnetic valve 10 on the basis of the received data. FIG. 19 is a flowchart of an opening/closing timing and lift amount calculation process 47 for this calculation that is executed by the microcomputer 63.

A setting is made in advance so that the process of FIG. 19 is started in a prescribed cycle. In this embodiment, the predetermined cycle is the cycle of the rectangles shown in the fifth part of FIG. 16. Alternatively, a setting may be made in advance so that the process of FIG. 19 is started at a prescribed rotation angle of the crankshaft.

At step 905, a latest required toque value is read. Specifically, the required toque value in data that are received by the electromagnetic valve ECU 9 in the above manner is employed as a latest required torque value.

At step 910, an engine rotation speed (Ne) is calculated on the basis of the difference between a previously received crankshaft angle and a crankshaft angle received this time. More specifically, the reciprocal of two times a period of crankshaft counter values in received data is employed as the engine rotation speed.

At step 915, opening/closing timing (Toc) of the intake valves 103 and the exhaust valves 104 is calculated by performing prescribed extrapolation processing on the basis of the received crankshaft counter value and required torque value and the engine rotation speed calculated at step 910. However, at this stage, this information has such a value that a communication delay time is not taken into consideration. FIG. 20 shows exemplary opening/closing timing of the intake valves 103 and the exhaust valves 104 in a case that the engine 13 has four cylinders.

The intake valve 103 and the exhaust valve 104 of each cylinder are opened and closed once every time the crankshaft makes two rotations (720° CA). In this embodiment, the opening/closing timing of the intake valves 103 and the exhaust valves 104 varies from one cylinder to another.

In the example of FIG. 20, for cylinder #1, a mixture is sucked into the combustion chamber 102 from the intake pipe 101 in a period of 0° CA to 180° CA (suction stroke), the sucked mixture is compressed in a period of 180° CA to 360° CA (compression stroke), the compressed mixture is exploded in a period of 360° CA to 540° CA (explosion stroke), and exhaust gas produced by the burning is exhausted in a period of 540° CA to 720° CA (exhaust stroke). That is, an opening/closing control on the intake valve 103 is performed on the basis of results of an opening/closing timing and lift amount calculation that was performed immediately before the suction stroke and an opening/closing control on the exhaust valve 104 is performed on the basis of results of an opening/closing timing and lift amount calculation that was performed immediately before the exhaust stroke. The valve controls can be performed more accurately by making a setting so that the opening/closing timing and lift amount calculation is performed a prescribed angle before the suction stroke and the exhaust stroke.

As such, the electromagnetic valves 10 are actuators that operate in synchronism with the crankshaft angle. However, actually, the opening/closing timing of the intake valve 103 and the exhaust valve 104 deviates from the timing of the crankshaft angle depending on the required torque and the engine rotation speed.

In this embodiment, since the value of the crankshaft counter is in the range of 0° to 360°, the microcomputer 63 cannot determine whether the crankshaft angle is in the range of 0° CA to 360° CA or in the range of 360° CA to 720° CA. Therefore, at step 915, opening/closing timing is calculated so that the intake valve 103 and the exhaust valve 104 are opened and closed in a cycle that is two times the rotation cycle of the crankshaft. More specifically, in a certain cycle the intake valve 103 is opened and closed at instants corresponding to prescribed angles of the crankshaft (in the range of 0° to 360°), in the next cycle the intake valve 103 is not opened and closed at instants corresponding to the prescribed angles of the crankshaft, and in the second next cycle the intake valve 103 is opened and closed at instants corresponding to the prescribed angles of the crankshaft. That is, the control of opening and closing the intake valve 103 is performed every other cycle at instants corresponding to the prescribed angles of the crankshaft. The control of opening and closing the exhaust valve 104 is likewise performed every other cycle at instants corresponding to the prescribed angles of the crankshaft.

The above controls make it possible to cause each electromagnetic valve 10 to operate in a cycle that is equal to the cycle (720°) of the crankshaft angle at instants corresponding to the prescribed crankshaft angles.

It is necessary that the opening and closing of each electromagnetic valve 10 be synchronized with the ignition by the associated igniter 7, the fuel injection by the associated injector 12, and other operations. For example, in the case of cylinder #1, the intake valve 103 is opened at 0° CA and the exhaust valve 104 is opened at 540° CA. In this case, fuel injection should be performed at about 0° CA or before 0° CA and ignition should be performed at about 360° CA or before 360° CA. Both of these instants correspond to 0° (=360°) in terms of the rotation angle of the crankshaft that can be detected from the crankshaft signal. Therefore, the fuel injection by the injector 12 and the ignition by the igniter 7 should be repeated alternately at instants corresponding to the prescribed rotation angle of the crankshaft. Further, the fuel injection should be performed when the intake valve 103 is opened.

The synchronization relating to the order of repetition of the controls of alternate operations of, for example, the injection by the igniter 7 and the fuel injection by the injector 12 at instants corresponding to a prescribed rotation angle of the crankshaft is set in the microcomputers 63 and 113 so that they match each other at a start of the vehicle engine 13, for example.

Lift amounts (L) of the intake valve 103 and the exhaust valve 104 are calculated on the basis of the received crankshaft counter value and required torque value, and the engine rotation speed calculated at step 910. The above extrapolation processing is equivalent to the extrapolation processing that was described in the first embodiment with reference to FIG. 8 to FIGS. 10A and 10B. However, in this embodiment, 720° CA in FIG. 8 to FIGS. 10A and 10B should be read as 360° CA.

At the next step 920, the opening/closing timing obtained at step 915 is corrected for a delay due to a communication etc. More specifically, a time ($\delta+\epsilon$) is subtracted from the opening/closing instant obtained at step 915. A values obtained by subtracting the time ($\delta+\epsilon$) is information indicating a delay time of ignition as measured from a time when the engine ECU 11 outputs data to the electromagnetic valve ECU 9.

At step 925, the opening/closing timing of the intake valve 103 and the exhaust valve 104 calculated at step 920 and the lift amounts calculated at step 915 are stored in a prescribed area of the RAM of the microcomputer 63.

The data of the opening/closing timing and the lift amounts that were calculated by the process of FIG. 19 and are stored in the RAM of the microcomputer 63 are read out in executing the suction/exhaust calculation process 46, and the opening and closing of the intake valve 103 and the exhaust valve 104 are controlled on the basis of the read-out opening/closing timing and the lift amounts.

As described above, the microcomputer 113 of the engine ECU 11 outputs a calculated crankshaft counter value to the intra-vehicle communication networks 8 by executing the crankshaft data setting and outputting process of FIG. 18, as a result of which the crankshaft angle information pass through the networks 8. Therefore, even if crankshaft angle information that has been sent is lost because of problems relating to communication rates etc., the control can be performed properly by using a crankshaft counter value that is sent next time and hence the temporal deviations between the controls on the electromagnetic valves 10 and the crankshaft angle can be suppressed.

Information relating to a crankshaft angle at an instant of outputting by the engine ECU 11 is passed from the engine ECU 11 to the electromagnetic valve ECU 9. Therefore, the delay time caused by a communication can be suppressed and the temporal deviations between the controls on the electromagnetic valves 10 and the crankshaft angle can further be suppressed.

Further, since the electromagnetic valve ECU 9 for controlling the electromagnetic valves 10 is provided alone, that is, it is provided separately from the other ECUs (e.g., engine ECU 11), the adverse effects, on the controls of the other ECUs, of electromagnetic noise generated by the controls on the electromagnetic valves 10 which may requires large currents can be reduced.

Although each embodiment of the invention employs TDMA as a multiple access method of the intra-vehicle communication, the invention is not limited to such a case. For example, CSMA/CD (carrier sense multiple access/collision detection) that is employed in CAN (controller area network) may be used.

In the first embodiment of the invention, the igniter 7 serves as an actuator that operates in synchronism with the vehicle crankshaft angle, the ignition ECU 4 serves as an actuator control ECU, and the TCM ECU 3 serves as a timing determination ECU. The actuator need not always be the igniter 7 and may be a fuel injector, for example.

The camshaft signal rising process and the crankshaft signal rising process of the microcomputer 23 shown in FIGS. 3 and 4 attains a crankshaft angle calculating means for calculating a crankshaft angle on the basis of a received camshaft signal and crankshaft signal.

The crankshaft data setting and outputting process of the microcomputer 23 shown in FIG. 6 serves as a crankshaft angle outputting means for outputting a crankshaft angle calculated by the crankshaft angle calculating means to a timing determining means via an intra-vehicle communication network.

The ignition timing calculating process of the microcomputer 33 shown in FIG. 7 serves as the timing determining means that is provided in one of the ECUs connected to the intra-vehicle communication network and determines operation timing of the actuator on the basis of the received crankshaft angle.

The ignition process 45 of the microcomputer 43 serves as a timing control means for controlling the actuator on the basis of the timing determined by the timing determining means.

The diagnostic process 26 of the microcomputer 23 serves as a failure diagnosing means.

In the second embodiment, the igniter 7 serves as an actuator that operates in synchronism with the vehicle crankshaft angle and the engine ECU 70 serves as an actuator control ECU. The diagnostic process 26 and the ignition timing process 34 constitute a timing determining means, and the ignition timing process 45 serves as a timing control means for controlling the actuator on the basis of timing determined by the timing determining means.

In the second embodiment, the diagnostic process 26, the ignition timing process 34, and the ignition process 45 are implemented as processes of the microcomputer in the same ECU. However, the diagnostic process 26 and the ignition timing process 34 may be implemented as processes in different ECUs and data may be exchanged between them by communications via the intra-vehicle communication networks 8. In this case, it can be said that α, β, and γ in FIGS. 6 and 7 are due to communication delay.

In the third embodiment, the electromagnetic valves 10 serve as actuators that operate in synchronism with the vehicle crankshaft angle, the electromagnetic valve ECU 9 serves as an actuator control ECU and a timing determining means, and the engine ECU 11 serves as the sensor ECU.

In the third embodiment, the electromagnetic valves 10 are electromagnetic valves for suction and exhaust of the engine. However, the invention is not limited to such a case and covers electromagnetic valves for performing controls in synchronism with the vehicle crankshaft angle.

The crankshaft angle rising process of the microcomputer 113 shown in FIG. 17 serves as a crankshaft angle calculating means for calculating a crankshaft angle on the basis of a received crankshaft signal.

The crankshaft data setting and outputting process of the microcomputer 113 shown in FIG. 18 serves as a crankshaft angle outputting means for outputting the crankshaft angle calculated by the crankshaft angle calculating means to the timing determining means via an intra-vehicle communication network.

The opening/closing timing and lift amount calculating process of the microcomputer 63 shown in FIG. 14 serves as a timing determining means that is provided in one of the ECUs connected to the intra-vehicle communication network and determines operation timing of the actuators on the basis of the received crankshaft angle.

The suction/exhaust calculation process 46 serves as a timing control means for controlling the actuators on the basis of the timing determined by the timing determining means.

The diagnostic process of the microcomputer 113 serves as a failure diagnosing means.

What is claimed is:

1. A vehicle control system comprising:
   an actuator control ECU, connected to an intra-vehicle communication network, for controlling an actuator that operates in synchronism with a crankshaft angle of a vehicle engine;
   a sensor-ECU, connected to the intra-vehicle communication network to which the actuator control ECU is connected, for receiving a crankshaft signal and a camshaft signal of the vehicle engine; and
   a means for determining timing of an event with respect to crankshaft angle,
   wherein the sensor ECU includes crankshaft angle calculating means for calculating a crankshaft angle on the basis of the received camshaft signal and crankshaft signal and crankshaft angle outputting means for outputting the crankshaft angle calculated by the crankshaft angle calculating means to the means for determining timing via the intra-vehicle communication network,
   wherein the means for determining timing is provided in one of ECUs that are connected to the intra-vehicle communication network and determines operation timing of the actuator on the basis of the received crankshaft angle, and
   wherein the actuator control ECU includes timing control means for controlling the actuator on the basis of the timing determined by the means for determining timing.

2. The vehicle control system according to claim 1, wherein the crankshaft angle outputting means further outputs, to the means for determining timing, via the intra-vehicle communication network, information relating to a crankshaft angle at a time point of outputting to the means for determining timing.

3. The vehicle control system according to claim 1, wherein the means for determining timing is provided in a timing determination ECU that is connected to the intra-vehicle communication network and is not the actuator control ECU or the sensor ECU, and outputs the determined operation timing of the actuator to the timing control means via the intra-vehicle communication network.

4. The vehicle control system according to claim 3, wherein the intra-vehicle communication network employs a TDMA communication method, and
   wherein the TDMA communication method the operation timing determined by the means for determining timing is assigned to a time between a time slot that is assigned to transmission from the sensor ECU and a time slot that comes first after the former time slot and is assigned to the timing determination ECU.

5. The vehicle control system according to claim 1, wherein the means for determining timing determines operation timing of the actuator on the basis of a crankshaft angle received immediately before and a crankshaft angle received one time before using linearly extrapolated time dependency of the crankshaft angle.

6. The vehicle control system according to claim 1,
wherein the sensor ECU includes failure diagnosing means for performing a failure diagnosis on a crankshaft sensor and a camshaft sensor.

7. A vehicle control system comprising:
an actuator control ECU, connected to an intra-vehicle communication network, for controlling an actuator that operates in synchronism with a crankshaft angle of a vehicle engine;
a sensor ECU, connected to the intra-vehicle communication network, for receiving a crankshaft signal of the vehicle engine;
a camshaft ECU, connected to the intra-vehicle communication network, for receiving a camshaft signal of the vehicle engine; and
a means for determining timing of an event with respect to crankshaft angle,
wherein the crankshaft ECU outputs information based on the received crankshaft signal to the means for determining timing,
wherein the camshaft ECU sends information based on the received camshaft signal to the means for determining timing,
wherein the means for determining timing determines operation timing of the actuator on the basis of the received information based on the crankshaft signal and information based on the camshaft signal,
wherein the actuator control ECU includes timing control means for controlling the actuator on the basis of the timing determined by the means for determining timing, and
wherein the intra-vehicle communication network allows the crankshaft ECU to send the information based on the received crankshaft signal without losing it.

8. A vehicle control system comprising:
an actuator control ECU, connected to an intra-vehicle communication network, for controlling an actuator that operates in synchronism with a crankshaft angle of a vehicle engine; and
a sensor ECU, connected to the intra-vehicle communication network, for receiving a crankshaft signal of the vehicle engine, and
a means for determining timing of an event with respect to crankshaft angle,
wherein the sensor ECU includes crankshaft angle calculating means for calculating a crankshaft angle on the basis of the received crankshaft signal and crankshaft angle outputting means for outputting the crankshaft angle calculated by the crankshaft angle calculating means to the means for determining timing via the intra-vehicle communication network,
wherein the means for determining timing is provided in one of ECUs that are connected to the intra-vehicle communication network and determines operation timing of the actuator on the basis of the received crankshaft angle, and
wherein actuator control ECU includes timing control means for controlling the actuator on the basis of the timing determined by the means for determining timing.

9. The vehicle control system according to claim 8,
wherein the crankshaft angle outputting means further outputs, to the means for determining timing via the intra-vehicle communication network, information relating to a crankshaft angle at a time point of the outputting to the means for determining timing.

10. The vehicle control system according to claim 8,
wherein the actuator is an electromagnetic valve.

11. A method for controlling an actuator in synchronism with an engine crankshaft angle using a communication network, said method comprising:
monitoring crankshaft rotational angle with a first ECU subsystem that calculates crankshaft angle based on received transducer signal representing rotation of the crankshaft and camshaft;
controlling actuator operation using a second ECU subsystem, said first and second ECU subsystems being connected for inter-communication of data via said communication network; and
determining actuator operation timing based on said calculated crankshaft angle and using said determined timing to control the actuator.

12. A method as in claim 11
wherein data representing said calculated crankshaft is conveyed via said communication network.

13. A method as in claim 11
wherein said determining step is performed in a third ECU subsystem that also communicates via said communication network.

14. A method as in claim 13
wherein TDMA is utilized to communicate data on said communication network and determined actuator operation timing data is assigned to a time slot having a known relative position and wherein the determined actuator operation timing data is calculated to compensate for any expected delay in data communication over said communication network.

15. A method as in claim 11
wherein said determining step uses crankshaft angle data received for at least two prior times and uses linearly extrapolate time dependency of the crankshaft angle.

16. A method as in claim 11
wherein the first ECU subsystem also performs a failure diagnosis on a crankshaft sensor and a camshaft sensor.

17. A method as in claim 11 wherein:
said first ECU subsystem uses a sensor ECU, connected to the communication network, to monitor a crankshaft sensor signal and a camshaft ECU connected to the communications network, to monitor a camshaft sensor signal; and
said determining step uses data received from the sensor ECU and the camshaft ECU via said communication network which allows the crankshaft ECU to send data based on the monitored crankshaft sensor signal without losing it.

18. A method as in claim 11 wherein:
said determining step uses calculated crankshaft angle data communicated over said communications network.

19. A method as in claim 18
wherein said crankshaft angle data that is communicated includes information relating to the expected crankshaft angle at the time of such communication.

20. A method as in claim 18
wherein the controlled actuator is an electromagnetic valve.

* * * * *